(12) United States Patent
Bansal et al.

(10) Patent No.: US 11,704,299 B1
(45) Date of Patent: Jul. 18, 2023

(54) FULLY MANAGED REPOSITORY TO CREATE, VERSION, AND SHARE CURATED DATA FOR MACHINE LEARNING DEVELOPMENT

(71) Applicant: Amazon Technologies, Inc., Seattle, WA (US)

(72) Inventors: Tanya Bansal, Seattle, WA (US); Vidhi Kastuar, Fremont, CA (US); Saurabh Gupta, Sammamish, WA (US); Alex Tang, Shoreline, WA (US); Lakshmi Naarayanan Ramakrishnan, Redmond, WA (US); Stefano Stefani, Issaquah, WA (US); Xingyuan Wang, Seattle, WA (US); Mukesh Karki, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 182 days.

(21) Appl. No.: 17/205,373

(22) Filed: Mar. 18, 2021

Related U.S. Application Data

(60) Provisional application No. 63/119,259, filed on Nov. 30, 2020.

(51) Int. Cl.
*G06F 7/00* (2006.01)
*G06F 16/22* (2019.01)
(Continued)

(52) U.S. Cl.
CPC ........ *G06F 16/2291* (2019.01); *G06F 16/219* (2019.01); *G06F 16/252* (2019.01);
(Continued)

(58) Field of Classification Search
CPC .. G06F 16/2291; G06F 16/219; G06F 16/252; G06F 21/602; G06N 20/00; G06K 9/6256
(Continued)

(56) References Cited

U.S. PATENT DOCUMENTS 7,315,826 B1 * 1/2008 Guheen .............. G06Q 30/0201
705/7.29

OTHER PUBLICATIONS

"An open source feature store for machine learning", Feast: Feature Store for Machine Learning, retrieved from the internet on Nov. 23, 2020 at <<https://feast.dev>>, 3 pages.
(Continued)

*Primary Examiner* — Isaac M Woo
(74) *Attorney, Agent, or Firm* — Lee & Hayes, P.C.

(57) ABSTRACT

Techniques and technologies for providing a fully managed datastore for clients to securely store, discover, retrieve, remove, and share curated data, or features, to develop machine learning (ML) models in an efficient manner. The feature store service may provide clients with the ability to create and store feature groups that include features and associated metadata providing clients with a quick understanding of features so that they may determine which features are suitable for training ML models and/or use with ML models. The feature store service may provide first a data store configured to store the most recent values associated with a feature group, such that client can access the features and utilize ML models to make real-time predictions with low latency and high throughput, and a second datastore configured to store historical values associated with a feature group, such that a client can utilize the features to train ML models.

20 Claims, 12 Drawing Sheets

(51) Int. Cl.
    *G06F 21/60*     (2013.01)
    *G06F 16/21*     (2019.01)
    *G06F 16/25*     (2019.01)
    *G06N 20/00*     (2019.01)
    *G06F 18/214*     (2023.01)

(52) U.S. Cl.
    CPC .......... *G06F 18/214* (2023.01); *G06F 21/602* (2013.01); *G06N 20/00* (2019.01)

(58) Field of Classification Search
    USPC ................................................ 707/600–899
    See application file for complete search history.

(56) References Cited

OTHER PUBLICATIONS

"Integrates with Sagemaker, Databricks, Kubeflow, Cloudera", Feature Store: Manage your Mt. Feature Data, retrieved from the internet on Nov. 23, 2020 at <<https://www.logicalclocks.com/hopsworks-featurestore>>, 3 pages.

* cited by examiner

800 ⟶

```
RECEIVE, FROM A CUSTOMER ACCOUNT REGISTERED WITH A SERVICE PROVIDER, A
REQUEST TO CREATE A FEATURE GROUP COMPRISING ONE OR MORE FEATURES,
THE ONE OR MORE FEATURES INCLUDING AT LEAST AN IDENTIFIER FEATURE FOR
IDENTIFYING THE FEATURE GROUP
802
```
↓
```
CREATE A FIRST DATABASE ASSOCIATED WITH THE CUSTOMER ACCOUNT, THE FIRST
DATABASE CONFIGURED TO STORE DATA REPRESENTING A MOST RECENT RECORD
INCLUDING VALUES ASSOCIATED WITH THE ONE OR MORE FEATURES IN THE
FEATURE GROUP
804
```
↓
```
CREATE A SECOND DATABASE ASSOCIATED WITH THE CUSTOMER ACCOUNT, THE
SECOND DATABASE CONFIGURED TO STORE DATA REPRESENTING ONE OR MORE
RECORDS INCLUDING VALUES ASSOCIATED WITH THE ONE OR MORE FEATURES IN
THE FEATURE GROUP
806
```
↓
```
RECEIVE, FROM THE CUSTOMER ACCOUNT AT A FIRST TIME, FIRST DATA INCLUDING
THE IDENTIFIER FEATURE AND FIRST VALUES ASSOCIATED WITH THE ONE OR MORE
FEATURES
808
```
↓
```
STORE, IN THE FIRST DATABASE, THE FIRST VALUES ASSOCIATED WITH THE ONE OR
MORE FEATURES AS THE MOST RECENT RECORD AT THE FIRST TIME
810
```
↓
```
STORE, IN THE SECOND DATABASE, THE FIRST VALUES ASSOCIATED WITH THE ONE
OR MORE FEATURES AS THE FIRST RECORD AT THE FIRST TIME
812
```
↓
( 8B )

902
RECEIVE, AT A FIRST TIME AND FROM A CUSTOMER ACCOUNT REGISTERED WITH A SERVICE PROVIDER, FIRST DATA INCLUDING AN IDENTIFIER FEATURE AND INDICATING AT LEAST A FIRST VALUE ASSOCIATED WITH A FIRST FEATURE INCLUDED IN A FEATURE GROUP ASSOCIATED WITH THE IDENTIFIER FEATURE

904
STORE, IN A FIRST DATABASE ASSOCIATED WITH THE CUSTOMER ACCOUNT, THE FIRST VALUE ASSOCIATED WITH THE FIRST FEATURE AS A MOST RECENT RECORD AT THE FIRST TIME, WHEREIN THE FIRST DATABASE IS CONFIGURED TO STORE DATA REPRESENTING THE MOST RECENT RECORD ASSOCIATED WITH THE FEATURE GROUP

906
STORE, IN A SECOND DATABASE ASSOCIATED WITH THE CUSTOMER ACCOUNT, THE FIRST VALUE ASSOCIATED WITH THE FIRST FEATURE AS A FIRST RECORD AT THE FIRST TIME, WHEREIN THE SECOND DATABASE IS CONFIGURED TO STORE DATA REPRESENTING ONE OR MORE RECORDS ASSOCIATED WITH THE FEATURE GROUP

908
RECEIVE, FROM THE CUSTOMER ACCOUNT AT A SECOND TIME, SECOND DATA INCLUDING THE IDENTIFIER FEATURE AND INDICATING AT LEAST A SECOND VALUE ASSOCIATED WITH THE FIRST FEATURE

910
STORE, IN THE FIRST DATABASE AND BASED AT LEAST IN PART ON DETERMINING THAT THE SECOND TIME IS MORE RECENT THAN THE FIRST TIME, THE SECOND VALUE ASSOCIATED WITH THE FIRST FEATURE AS THE MOST RECENT RECORD AT THE SECOND TIME

912
STORE, IN THE SECOND DATABASE, THE SECOND VALUE AS A SECOND RECORD AT THE SECOND TIME

FIG. 9

FULLY MANAGED REPOSITORY TO CREATE, VERSION, AND SHARE CURATED DATA FOR MACHINE LEARNING DEVELOPMENT

RELATED APPLICATIONS

This application claims priority to U.S. Provisional Patent Application No. 63/119,259, filed on Nov. 30, 2020, the entire contents of which are incorporated herein by reference.

BACKGROUND

Service providers offer cloud-based services to fulfill users' computing-service needs without the users having to invest in and maintain computing infrastructure required to implement the services. These service providers may maintain networks of managed computing resources and functionality to implement various types of on-demand services, such as storage services, compute-power services, database-management services, networking services, and so forth. In this way, service providers maintain service provider networks that provide users with on-demand delivery of compute power, database storage, applications, and other resources, rather than the users having to make upfront investments in hardware and spend time and resources managing the hardware.

A client of such a service provider may configure numerous resources of the service provider to provide one or more services to a large number of users, each of whom may access the resources and consume the services using respective user devices. While the service providers may provide hosting for services, such as machine learning (ML) services, there is still a great burden of work placed on the client to build and/or train ML models. For example, a client must prepare and manage a very large amount of data using various transformation techniques, such as reformatting, restructuring, or even altering values of data before it can be utilized to build and train ML models. Given the high density of the data, the complex transformations required to curate data for training such ML models, and the lack of access and availability to share such curated data, clients may have to visually inspect the data and perform these tedious transformations on a per model basis, causing a significant slowdown in the development of these ML models.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 8A and 8B collectively illustrate a flow diagram of an example method for a service provider network to receive a request to create a feature group, create an online data store and an offline data store, and store curated data associated with the feature group in such a manner to maintain consistency between the online data store and the offline data store.

FIG. 9 illustrates a flow diagram of an example method for a service provider network to receive and store curated data associated with a feature group in such a manner to maintain consistency between an online data store and an offline data store associated with the feature group.

DETAILED DESCRIPTION

Figure 1:
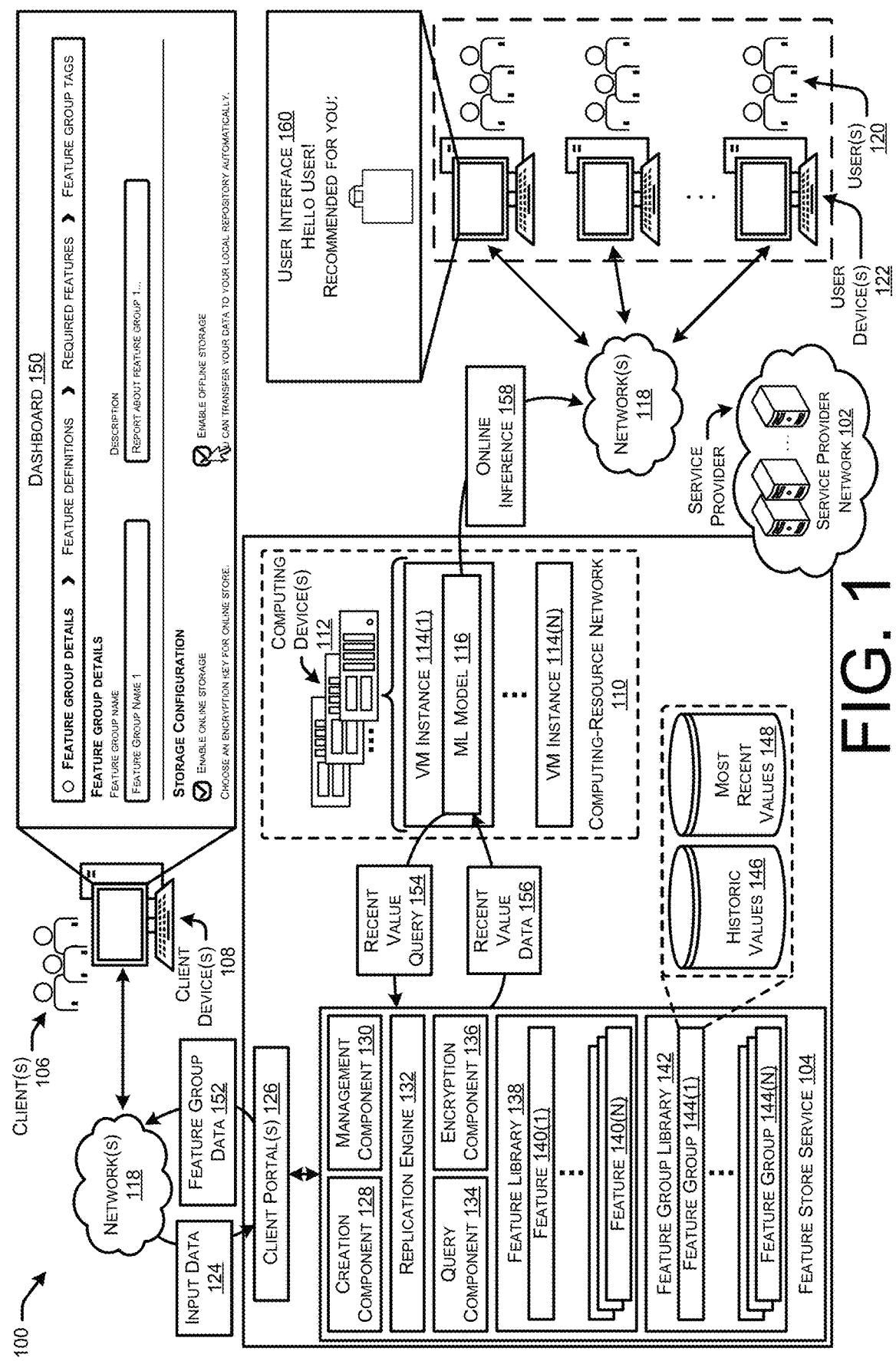
FIG. 1 illustrates a system-architecture diagram of an example environment in which a feature store service of a service provider network creates, manages, and provides accessibility to curated data for the use and development of ML models. Clients may create feature groupings configured to logically group curated data to define records which may be utilized in the use and development of ML models. The feature store service may provide clients with a historic values data store for training ML models using big data, and a most recent values data store for trained ML models to perform real-time inferences with low latency.

Service providers offer various network-based (or "cloud-based") services to users to fulfill computing needs of the users. These service providers may operate service provider networks that include managed computing resources and functionality to implement various types of on-demand services, such as storage services, compute-power services, database-management services, networking services, and so forth. A client of the service provider network may configure numerous resources of the service provider to provide one or more services to a large number of users, each of whom may access the resources and consume the services using respective user devices. While the service providers may provide hosting for services, such as ML services, there is still a great burden of work placed on the client to build and/or train ML models, causing a significant slowdown in the development of ML models. Additionally, there may be inconsistencies between data used in both training and producing real-time inferences, often leading to unpredictable ML model behavior. As such, ML model builders may desire a more efficient way to create, version, share, and manage curated data (also referred to herein interchangeably as "features") for ML development.

As noted above, ML model builders desire more efficient ways to manage and reuse features previously developed to accelerate the development of ML models and also to enforce consistency of the features used in the training of, and real-time inferencing performed by, ML models to help ensure predicable ML model behavior. However, there is currently no viable way to share features across ML applications while remaining compliant with rigorous security and access control policies. As such, clients have to perform tedious computations on raw data to create features for every ML models, leading to inconsistencies in both the features used to train models and the real-time inferences produced by such models.

This disclosure describes, in part, techniques and technologies implemented by a feature store service of a service provider network to provide clients with a fully managed, purpose-built data store for clients to securely store, discover, retrieve, remove, and share curated data, or features, to develop ML models in an efficient manner. The feature store service may provide clients with the ability to create and store feature groups including the features and associated metadata that provide clients with a quick understanding of features so that they may determine which features are suitable for training ML models and/or producing real-time inferences using ML models. The feature store service provides a centralized location to store all of an organization's features, allowing for sharing and reuse of features, reducing cost of development and development times for ML models. The feature store service may provide online configurations of data storage, such that clients may utilize various components of the feature store service to access features for real-time predications with low millisecond latency and high throughput to ensure high performance during production. Additionally, or alternatively, the feature store service may provide offline configurations of data storage, such that clients may utilize various components of the features store service to access features with high throughout and high bandwidth reads and writes for batch inferencing and model training.

The feature store service may be configured to store feature groups. Feature groups may be configured as a logical grouping of features to describe records. Features may be configured as raw data that has been converted and/or transformed to train ML models. Records may be configured as a collection of values for features in a feature group. Records may be identified within a feature group in various ways. For example, a record may include a corresponding event time and/or a record identifier value. In some examples, the event time may be a timestamp at which the record was created, recorded, and/or updated with the service. In some examples, a feature included in a feature group may be configured as the record identifier value. For example, a "CustomerId" feature may be configured as a record identifier value for a "CustomerPurchasePatterns" feature group, which contains features such as, "CustomerId," "TransactionsTotal," and "NumberOfTransactionsLast30Days." In such an example feature group, records may be identified within a feature group using the record identifier value and the event time of the record. For example, a user can use the record identifier value of "CustomerId" to identify all of the records for this feature group, and further identify a record corresponding to a specified time using the event time of the record.

Feature groups may be defined, or created by clients providing input data describing various aspects of the feature group, such as, for example, the features that are required by the feature group, designating a feature as a record identifier value for a feature group, opting-in and/or opting-out of a historic values data store (also referred to herein interchangeably as "offline data store") and/or a most recent values data store (also referred to herein interchangeably as "online data store"), and/or access control features for the various data stores associated with the feature group. For example, a client may describe a feature group including a feature group name, such as, for example, "CustomerPurchasePatterns," having various features, such as, for example, "CustomerId," "TransactionsTotal," and "NumberOfTransactionsLast30Days." In such an example, the client may include in the feature group description that the "CustomerId" feature is configured as the record identifier value for the feature group. Additionally, or alternatively, the client may opt-in and/or opt-out of an offline data store for the feature group and/or an online data store for the feature group.

Once a feature group has been defined or created, a client can begin registering features with the feature store service to include the feature in specified feature groups. As previously mentioned, features may be configured as raw data that has been converted and/or transformed to train ML models. In some examples, a client may register a feature with the feature store service and provide the schema, tags, and metadata associated with the feature. The schema for a feature may be required for the feature store service to perform actions on the features. Tags may be utilized by clients and/or assigned to features and/or feature groups. In some examples, the metadata associated with a feature may include various data, such as, for example, the code used to compute the feature, version information associated with the feature, feature analysis data, and/or feature documentation.

As previously mentioned, tags may be assigned to features and/or feature groups. In some examples, a client may assign a curated tag to a feature when registering the feature with the feature store service. Additionally, or alternatively, a client may assign a curated tag to a feature group when creating the feature group. Tags may be utilized to search and/or group features in the feature store service. For example, a client may search the feature store for a specified tag. In some examples, the client may create a feature grouping using the features included in the results of the search.

The offline data store may be configured to store various data associated with a feature group. In some examples, the offline data store may store records and/or values associated with features of a feature group. For example, the offline data store may be configured to store a full history of the records that have been included, or populated, into the feature group of the feature store service. The offline data store may index the history of the records based on event time, such that the records are organized by age from oldest to newest. This configuration may be utilized for version control of records and/or targeting records ingested between specified time periods.

Additionally, or alternatively, the offline data store may be configured such that a client can execute a point-in-time query on the data to retrieve records having event timestamps and/or write timestamps between a specified lower bounded date and/or time and a specified upper bounded date and/or time. Such a point-in-time query may provide a client with the ability to target data records for version control, state rollbacks, and/or data analysis. For example, a client may wish to observe the changes of a trained ML model over time. The client may execute various point-in-time queries on the offline data store to retrieve data records having event timestamps and/or write timestamps occurring in various time intervals, train separate ML models using the data, and observe the differences in inferencing, consistency, and the like.

The online data store may be configured to store various data associated with a feature group. In some examples, the online data store may store a record and/or values associated with the features of a feature group. For example, the online data store may be configured to as low-latency, high-availability cache for a feature group, configured to enable real-time lookup of records. In some examples, the online data store may store only the latest record, as identified by the event time, per unique record identifier value of a feature group. For example, if the feature store service receives a call to ingest first a record for "CustomerId" of 12345 with an event time of "Nov. 25, 2020, 5:00 pm," followed by a call to ingest a second record for the same "CustomerId" of 12345 with an event time of "Nov. 25, 2020, 6:00 pm," then only the second record with the event time of "Nov. 25, 2020, 6 pm" will be available in the online data store. This configuration may enable clients the ability to access features for real-time inferences (or predictions) with low millisecond latency and high throughput to ensure high performance in production. For example, a client may have a trained ML model hosted on a virtual machine (VM) instance executing on one or more computing devices of a computing resource network. The trained ML model and/or the VM instance may be configured to query the online data store to retrieve the most recent record associated with a record identifier value and produce a real-time inference by running the trained ML model against the recent record.

The feature store service may ingest data to populate feature groups with records associated with features in various ways. In some examples, the feature store service may utilize a streaming ingestion technique and/or a batch ingestion technique to ingest data associated with a feature group. The streaming ingestion technique (also referred to herein interchangeably as "streaming features") may allow the feature store service to push records into a feature group by utilizing synchronous API calls, allowing only small batches of updates to be pushed with a single call. Streaming features may allow a client to publish values to the online data store and/or offline data store as soon as an event occurs with a subsequent API call, thus maintaining high freshness of records. Additionally, or alternatively, the batch ingestion technique may allow the feature store service to pull values associated with the features of a feature group from a specified data source at a fixed cadence selected by the client and/or as new data shows up. The batch ingestion technique may allow the client to create a feature grouping and direct the feature store service to existing data sources such that the feature store service may automatically ingest the data as features corresponding to the feature group.

The feature store service may be configured to maintain consistency between an offline data store associated with a feature group and an online data store associated with the same feature group. For example, the feature store service may include an automated data consistency workflow configured to replicate data stored in the online data store, containing the most recent values, and store the replicated data in the offline data store, containing the historic record values. In an example process for the automated data consistency workflow, the feature store service may receive incoming data associated with a feature group, such as a record. The feature store service may then update the record of the feature group, corresponding to the record identifier value specified in the incoming data, in the online data store. The feature store service may then replicate the incoming data such that the replicated data is included in an offline data store stream for ingestion into the offline data store associated with the feature group. The feature store service may then be configured to wait for a threshold amount of time to elapse and/or for a threshold amount of data to accumulate in the ingestion stream. In some examples, the threshold amount of time and/or the threshold amount of data may be specified by the client, such as, for example, a threshold amount of time as 5 minutes and a threshold amount of data as 6 megabytes (MB). During this wait period, the feature store service may further receive incoming data and repeat the steps previously performed, such as, updating the record of the feature group in the online data store and/or replicating the incoming data into the ingestion stream. Once the threshold amount of time has elapsed and/or the threshold amount of data has been accumulated in the stream, the feature store service may securely access the offline data store associated with the feature group and push a record and/or data representing values corresponding to features into the offline data store, including the corresponding event time of the record. The feature store service may repeat this action until no more data items, such as records, remain in the stream.

As mentioned above, when defining a feature group, a client may provide access control features for the various data stores associated with the feature group. For example, a client may define various encryption keys for the feature store service to utilize when performing the various techniques described herein, such as, for example, reading, writing, and/or any other form of access to the online data store and/or offline data store associated with a feature group. In some examples, the feature store service may be configured to allow the client to differentiate encryption keys across different feature groups, such that a client can implement access control across an organization by department, for example. Additionally, or alternatively, the feature store service may be configured to allow the client to differentiate encryption keys between the online data store and the offline data store of a feature group, such that a client can implement another variation of access control, for example, allowing data scientists associated with an organization to access the offline data store for training ML models while denying the data scientists access to most recent values stored in the online data store. The feature store service may be configured to create access grants on client encryption keys to enable the system to read, write, and/or access the online data store and/or the offline data store and perform the automated processes described herein, such as, for example, the creation of feature groups, maintaining the consistency of the data between the online and offline data stores, data ingestion, and the like.

The machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

This application describes techniques that accelerate the development of ML models and enforce consistency of features used in training and performing real-time inferences by managing and reusing curated data, or features, that have been previously developed. The feature store service may allow a user to create and share feature groupings amongst those in an associated organization. In this way, the techniques described herein remove the need to reengineer features for the training of separate ML models, which reduces the amount of computing resources that are allocated or reserved for engineering features and accelerates the development of ML models, and instead encourages clients to reuse features, leading to more predictable model behavior and an increase in consistency. Additionally, the techniques improve the ability to make real-time inferences with fresh data. The feature store service may maintain an online data store configured to store only the most recent record per record identifier value of a feature group, and an offline data store configured to store a full history of the records that have been included in a feature group. The offline data store may be used to train ML models, while the online data store may be configured to as low-latency, high-availability cache for a feature group, configured to enable real-time lookup of records with low millisecond latency and high throughput.

Although the techniques described herein are with reference to virtual machines or VM instances and virtual machine types, in some examples, the techniques are applicable to any type of virtual computing resource. For example, the techniques are generally applicable to any type of virtual computing resource that is allocated underlying portions of physical computing resources and executes within a virtual machine, or independently executes on the physical computing resources. Such virtual computing resources can include a container executing on a physical resource, a virtual machine instance running one or more containers, processes, software, and/or any other executable that is allocated portions of physical computing resources.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a feature store service of a service provider network creates, manages, and provides accessibility to curated data for the use and development of ML models. The feature store service may allow clients to create feature groupings configured to logically group curated data to define records which may be utilized in the use and development of ML models. The feature store service may provide clients with a historic values data store for training ML models using big data, and a most recent values data store for trained ML models to perform real-time inferences with low latency.

As illustrated, a service provider network 102 may be operated and/or managed by a service provider. The service provider network 102 may provide various services to clients 106 to fulfil their computing resource needs, such as cloud-based computing resources. For example, the service provider network 102 may provide cloud-based, scalable, and network accessible compute power services, storage services, database services, and/or other services. Clients 106 may utilize client devices 108 to subscribe for use of the computing resources and/or services provided by the service provider network 102. The service provider network 102 may include a feature store service 104 that is configured to create and manage feature groupings for clients 106 in purpose-built data stores for the development and training of ML models and producing real-time inferences with trained ML models.

The service provider network 102 may span across different geographic regions, and include or be associated with a computing-resource network 110 that includes clusters of managed computing devices 112 (e.g., servers) stored in data centers located across the different geographic regions. In this way, clients 106 who have subscribed for use of the network-based services supported by computing resources in the data centers need not invest in and maintain the computing infrastructure required to implement the various services that they may need. In some examples, clients 106 of the service provider network 102 may access or utilize computing resources of the computing devices 112 in the data centers located in different geographic regions such that clients 106 located in these different geographic regions are provided with access these resources and services.

Generally, the computing devices 112 may provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The computing devices 112 may be various types of computing devices, such as devices that have different chip set generations, are from different vendors, have different hardware architectures, and so forth.

Thus, the computing resources of the computing-resource network 110 provided by the computing devices 112 can include, for example, any hardware computing device resources, such as processor computing power/capacity, read-only and/or random-access memory, data storage and retrieval systems, device interfaces such as network or peripheral device connections and ports, and the like. In some embodiments, these resources may be dispersed among multiple discrete hardware computing devices (e.g., servers), and these hardware computing devices 112 may implement or communicate with a virtualization layer and corresponding virtualization systems (e.g., a hypervisor on a server), whereby the compute resources are represented by, and made accessible as, virtual computing resources, such as instances of virtual machine or "VM instances." A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

As illustrated, the computing devices 112 may each support VM instances that may be different types of VM instances provided by the service provider network 102. For instance, computing devices 112 may support one or more VM instances 114(1)-114(N) that are of different VM instance types. Rather than allocating all the computing resources of an entire computing device 112 to support a workload, such as an ML model 116 for the client 106, the service provider network may include a virtualization layer (e.g., containing one or more hypervisors) that includes instances of "virtual" computing resources (also referred to interchangeably herein as "virtual machines" or "VM instances") that represent the allocated portions of the physical computing resources of the computing devices 112. These VM instances 114 may emulate computing devices 112 to operate and support workloads, and may have their own operating systems, processing capabilities, storage capacity, and network connections or interfaces.

The ML models 116 as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether a purchase will be made on a store. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, a workload may generally include a designated collection or grouping of computing resources (e.g., compute, memory, storage, networking, etc.) in the computing-resource network 110, and the code or logic that performs functionality using the computing resources. The service provider network 102 may support a wide variety of workloads, such as web servers, databases, customer-facing applications, distributed data stores, batch processing, machine/deep learning training and/or inference, online gaming, video encoding, memory caching, and/or any other type of workload that can be supported by computing resources of the computing-resource network 110.

Clients 106 may create client accounts with the service provider to utilize the resources and services of the service provider network. The clients 106 may utilize their client devices 108 to communicate over one or more networks 118 (e.g., WANs, PANs, LANs, etc.) with the service provider network 102. Additionally, or alternatively, users 120 may utilize user devices 122 to communicate over the one or more networks 118 with the service provider network 102. The client devices 106 and/or user devices 122 may comprise any type of computing device configured to communicate over network(s) 118, such as mobile phones, tablets, laptop computers, desktop computers, televisions, servers, and/or any other type of computing device. The clients 106 may desire that the service provider network 102 host or support workloads, such as, for example, trained ML models, on the computing-resource network 110 that is managed by the service provider. Accordingly, the clients 106 may, via their user account, request that a workload be launched on their behalf, and provide input data 124 via one or more client portals 126 (e.g., web console, command line interface (CLI), application programming interface (API), etc.). The client portals 126 may provide the input data 124 to the feature store service 104 which includes a creation component 128, a management component 130, a replication engine 132, a query component 134, an encryption component 136, a feature library 138 for storing one or more features 140(1)-(N), and/or a feature group library 142 for storing one or more feature groups 144(1)-(N). In some examples, each of the individual feature groups 144(1)-(N) may include a historic values data store 146 (also referred to herein interchangeably as "offline data store"), and/or a most recent values data store 148 (also referred to herein interchangeably as "online data store").

The service provider network 102 may include one or more hardware processors (processors), one or more devices, configured to execute one or more stored instructions. The processor(s) may comprise one or more cores. Further, the service provider network 102 may include one or more network interfaces configured to provide communications between the service provider network 102 and other devices, such as the client device(s) 108, computing devices 112, user device(s) 122, and/or other systems or devices in the service provider network 102 and/or remote from the service provider network 102. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi, and so forth.

The service provider network 102 may also include computer-readable media that stores various executable components (e.g., software-based components, firmware-based components, etc.). The computer-readable-media may store components to implement functionality described herein. While not illustrated, the computer-readable media may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Wash. According to further embodiments, the operating system(s) can comprise the UNIX operating system or one of its variants. It should be appreciated that other operating systems can also be utilized.

Additionally, the service provider network 102 may include a data store which may comprise one, or multiple, repositories or other storage locations for persistently storing and managing collections of data such as databases, simple files, binary, and/or any other data. For example, the data store may comprise the feature library 138 and/or the feature group library 142. The data store may include one or more storage locations that may be managed by one or more database management systems.

The computer-readable media may store portions, or components, of the feature store service 104 described herein. For instance, the computer-readable media may store at least the creation component 128, the management component 130, the replication engine 132, the query component 134, the encryption component 136, the feature library 138, and/or the feature group library 142.

The computer-readable media may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service provider network 102, and or any components included therein, may be performed by one or more computer devices operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The feature store service 104 includes the creation component 128 that is configured to create feature groups 144. Feature groups 144 may be configured as a logical grouping of features 140 to describe records. Features 140 may be configured as raw data that has been converted and/or transformed to train ML models 116. Records may be configured as a collection of values for features 140 in a feature group 144. Records may be identified within a feature group 144 in various ways. For example, a record may include a corresponding event time and/or a record identifier value. In some examples, the event time may be a timestamp at which the record was created, recorded, and/or updated with the service 104. In some examples, a feature 140 included in a feature group 144 may be configured as the record identifier value.

The creation component 128 may send data to the client device(s) 108 configured to populate and present a dashboard 150 on a display of the client device(s) 108. The dashboard 150 may be configured to present various user interfaces to the client(s). In some examples, the dashboard may be configured to display a user interface for presenting feature group data 152, such as, for example, data for registering a feature 140, data for presenting a feature 140, data for creating a feature group 144, data for presenting a feature group 144, and/or any other data required to interact with a feature 140 and/or a feature group 144 using the techniques described herein. The user interfaces may be configured to receive user input represented as the input data 124, and the client device(s) 108 may transmit the input data 124 over the network(s) 118 to the feature store service 104 for use in the creation and/or management of the feature groups.

As mentioned above, feature groups may be defined, or created by clients 106 providing input data 124 describing various aspects of the feature group 144, such as, for example, the features 140 that are required by the feature group 144, designating a feature 140 as a record identifier value for a feature group 144, opting-in and/or opting-out of a historic values data store 146 and/or a most recent values data store 148, and/or access control features for the various data stores associated with the feature group 144. For example, a client 106 may describe a feature group 144 including a feature group name, such as, for example, "CustomerPurchasePatterns," having various features, such as, for example, "CustomerId," "TransactionsTotal," and "NumberOfTransactionsLast30Days." In such an example, the client 106 may include in the feature group description that the "CustomerId" feature is configured as the record identifier value for the feature group 144. Additionally, or alternatively, the client 106 may opt-in and/or opt-out of an offline data store 146 for the feature group 144 and/or an online data store 148 for the feature group 144. In such an example where the "CustomerId" feature 140 may be configured as a record identifier value for the "CustomerPurchasePatterns" feature group 144, records may be identified within a feature group 144 using the record identifier value and the event time of the record. For example, a client 106 can use the record identifier value of "CustomerId" to identify all of the records for this feature group 144, and further identify a record corresponding to a specified time using the event time of the record. The creation component 128 may be configured to utilize the input data 124 including the description of the feature group to create the feature group 144.

Additionally, or alternatively, the creation component 128 may be configured to allow a client 106 to register a feature 140 with the feature store service 104. As previously mentioned, features 140 may be configured as raw data that has been converted and/or transformed to train ML models 116. In some examples, a client 106 may register a feature 140 with the feature store service 104 and provide the schema, tags, and metadata associated with the feature 140. The schema for a feature 140 may be required for the feature store service 104 to perform actions on the feature 140. Tags may be utilized by clients 106 and/or assigned to features 140 and/or feature groups 144. In some examples, the metadata associated with a feature 140 may include various data, such as, for example, the code used to compute the feature, version information associated with the feature, feature analysis data, and/or feature documentation.

The creation component 128 may further be configured to provide clients 106 the ability to create tags and/or assign tags to features 140. As previously mentioned, tags may be assigned to features 140 and/or feature groups 144. In some examples, a client 106 may assign a curated tag to a feature 140 when registering the feature 140 with the feature store service 104. Additionally, or alternatively, a client 106 may assign a curated tag to a feature group 144 when creating the feature group 144. Tags may be utilized to search and/or group features 140 in the feature store service 104. For example, a client 106 may search the feature library 138 for a specified tag. In some examples, the client 106 may create a feature grouping 144 using the features 140 included in the results of the search. For example, the client 106 may tag certain features 140 to identify all of the features 140 associated with a particular department of an organization or entity. When a client 106 searches the feature library 138 of the feature store service 104, the results may return all of the features 140 and/or feature groups 144 that have been assigned the corresponding tag.

The feature store service 104 may also include the management component 130 that is configured to manage the feature groups 144. The management component 130 may be configured to perform various automated actions to maintain the feature groups 144 and/or the associated historic values data store 146 and/or the most recent values data store 148. For example, the management component 130 may receive and process various API calls configured to add, remove, edit, retrieve and/or transform the data included in the feature groups 144 and/or the associated historic values data store 146 and/or the most recent values data store 148.

As mentioned above, the management component 130 may receive and process various API calls. In some examples, the management component 130 may receive data via the API calls and may cause the feature store service 104 to ingest the data and populate feature groups 144 with records associated with the features 140 included in the feature group 144 in various ways. In some examples, the management component 130 may utilize a streaming ingestion technique and/or a batch ingestion technique to ingest data associated with a feature group 144. The streaming ingestion technique (also referred to herein interchangeably as "streaming features") may allow the feature store service 104 to push records into a feature group 144 by utilizing synchronous API calls, allowing only small batches of updates to be pushed with a single call. Streaming features may allow a client 106 to publish values to the online data store 140 and/or offline data store 138 as soon as an event occurs with a subsequent API call, thus maintaining high freshness of records. For example, a client 106 may utilize an event monitoring service and/or the management component 130 to monitor an endpoint executing a service, such as, for example, a VM instance 114 hosting an ML model and executing within the computing-resource network, for specific events, such as, for example, a user 120 interaction. Once the event occurs, the data associated with the event may be pulled and transmitted to the feature store service 104, where it is stored in the most recent values data store 148 of the associated feature group 144 and may be available to be utilized with an ML model 116 to generate a real-time inference. Additionally, or alternatively, the batch ingestion technique may allow the feature store service 104 to pull values associated with the features of a feature group 144 from a specified data source at a fixed cadence selected by the client 106 and/or as new data shows up. The batch ingestion technique may allow the client 106 to create a feature grouping 144 and direct the feature store service 104 to existing data sources such that the feature store service 104 may automatically ingest the data as records of features 140 corresponding to the feature group 144.

The feature store service 104 may also include the replication engine 132 that is configured to maintain consistency between an offline data store 146 associated with a feature group 144 and the online data store 148 associated with the same feature group 144. For example, the replication engine 132 may include an automated data consistency workflow configured to replicate data stored in the online data store 148 associated with a feature group 144, containing the most recent values 148, and store the replicated data in the offline data store 146 associated with the same feature group 144, containing the historic record values 146. In some examples, the replication engine 132 may be configured to replicate incoming data and store the incoming data into both the online data store 148 and the offline data store 146 simultaneously. In an example process for the automated data consistency workflow, the feature store service 104 may receive incoming data associated with a feature group 144, such as a record. The feature store service 104 may then update the record of the feature group 144, corresponding to the record identifier value specified in the incoming data, in the associated online data store 148. The replication engine 132 may then replicate the incoming data such that the replicated data is included in a data stream for ingestion into the offline data store 146 associated with the feature group 144. The replication engine 132 may then be configured to wait for a threshold amount of time to elapse and/or for a threshold amount of data to accumulate in the ingestion stream. In a non-limiting example, the threshold amount of time and/or the threshold amount of data may be specified by the client 106, such as, for example, a threshold amount of time as 5 minutes and a threshold amount of data as 6 megabytes (MB). It should be appreciated that client(s) 106 may set the time threshold to any measurement of time and/or the data threshold to any measurement of data. During this wait period, the replication engine 132 may further receive incoming data and repeat the steps previously performed, such as, updating the record of the feature group 144 in the corresponding online data store 148 and/or replicating the incoming data into the ingestion stream. Once the threshold amount of time has elapsed and/or the threshold amount of data has been accumulated in the stream, the feature store service 104 may securely access the offline data store 146 associated with the feature group and push a record and/or add data representing values corresponding to features into the offline data store 146, including the corresponding event time associated with the record. The feature store service 104 may repeat this action until no more data items, such as records, remain in the stream.

The feature store service 104 may also include the query component 134 that may be configured to process input data 124 received from a client device 106 representing a request to query the feature library 138 and/or feature group library 142 of the feature store service 104 for a desired feature 140. Additionally, or alternatively, the query component 134 may be configured to process recent value queries 154 received from an endpoint configured to communicate with the feature store service 104, such as, for example, VM instances 114 operating on computing device(s) 112 included in a computing-resource network 110.

The client 106 may provide input via the GUI displayed on the dashboard 150, where the client device 108 may transmit input data 124 representing the input to the feature store service 104. As previously mentioned, the query component 134 may be configured to process the input data 124 representing a request to query the feature library 138 and/or the feature group library 142 of the feature store service 104 for a desired feature 140. For example, a client 106 may desire to browse the feature library 138 of the feature store service 104 for various features 140. In some examples, the client 106 may know what feature 140 they desire and/or may be aware of metadata and/or tags associated with a feature 140 and may provide such information as a request to query feature library 138 and/or the feature group library 142 of the feature store service 104. The query component 134 may efficiently query the feature store service 104 for features 140 that meet the criteria included in the query request.

Additionally, or alternatively, a client 106 may deploy a trained ML model 116 to an endpoint for use in production, such as, for example, a VM instance 114 executing on a computing device 112 of a computing-resource network. In some examples, the ML model 116 may be configured to make predictions, or online inferences 158, in real-time. To make such a prediction in real-time, the ML model 116 may require features 140 to be served to the model with low, sub-second, latency. In some examples, the ML model 116 may transmit a recent value query 154, including a record identifier value, to the feature store service 104, where the query component 134 may utilize schema and/or metadata to identify which feature group 144 the ML model 116 has been trained on. The query component 134 may access the most recent values 148 associated with the identified record included in the feature group 144 and may return recent value data 156 for use by the ML model 116 in making real-time predictions, or online inferences 158.

The feature store service 104 may also include the encryption component 136 that is configured to manage client 106 defined encryption keys and create access grants on encryption keys to enable the feature store service 104 to read, write, and/or access the offline data store 146 and/or the online data store 148 of feature groups and perform automated processes described herein. Additionally, or alternatively, the encryption component 136 may be configured to provide the client 106 with various access control features.

As mentioned above, when defining a feature group 144, a client 106 may provide access control features for the various data stores associated with a feature group 144. In some examples, the encryption component 136 may be configured to allow the client 106 to differentiate encryption keys across different feature groups 144, such that a client 106 can implement access control across an organization and/or an entity by department, for example. Additionally, or alternatively, the encryption component may be configured to allow the client 106 to differentiate encryption keys between the online data store 148 and the offline data store 146 of a feature group 144, such that a client 106 can implement another variation of access control, for example, allowing clients 106 having a first role with an associated entity to access the offline data store 146 of a feature group 144 for training ML models while denying the clients 106, having the first role, access to most recent values stored in the online data store 148 of the feature group 144. As previously mentioned, the encryption component 136 may be configured to create access grants on client encryption keys to enable the system to read, write, and/or access the online data store 148 and/or the offline data store 146 and perform the automated processes described herein, such as, for example, the registration of features 140, the creation of feature groups 144, maintaining the consistency of the data between the online data store 148 and offline data store 146 of the same feature group 144, data ingestion, and the like.

The feature store service 104 may also include the feature library 138 that is configured to store features 140(1)-(N) registered with the feature store service 104. As previously mentioned, features 140 may be configured as raw data that has been converted and/or transformed to train ML models 116. The feature library 138 may be configured such that a client 106 may provide input data 124 to the feature store service 104 representing a request to query the feature library 138 by specifying criteria, such as, for example, metadata and/or tags associated with a desired feature 140.

The feature store service 104 may also include the feature group library 142 that is configured to store feature groups 144(1)-(N) defined in the feature store service 104. As previously mentioned, feature groups 144 may be configured as a logical grouping of features 140 to describe records. Records may be configured as a collection of values for features 140 in a feature group 144. Records may be identified within a feature group 144 in various ways. For example, a record may include a corresponding event time and/or a record identifier value. In some examples, the event time may be a timestamp at which the record was created, recorded, and/or updated with the service 104. In some examples, a feature 140 included in a feature group 144 may be configured as the record identifier value.

Additionally, or alternatively, the feature group library 142 may be configured such that a client 106 may provide input data 124 to the feature store service 104 representing a request to query the feature group library 142 by specifying criteria, such as, for example, metadata, tags, and/or feature names associated with a desired feature group 142. In some examples, each feature group 144(1)-(N) included in the feature group 142 library may include a corresponding historic values (offline) data store 146 and/or a most recent values (online) data store 148.

The offline data store 146 may be configured to store various data associated with a feature group 144. In some examples, the offline data store 146 may store records and/or values associated with features 140 of a feature group 144. For example, the offline data store 146 may be configured to store a full history of the records that have been included, or populated, into a feature group 144 defined in the feature store service 104. The offline data store 146 may index the history of the records based on event time, such that the records are organized by age from oldest to newest. This configuration may be utilized for version control of records and/or targeting records ingested between specified time periods.

Additionally, or alternatively, the offline data store 146 may be configured such that a client 106 can execute a point-in-time query on the data to retrieve records having event timestamps and/or write timestamps between a specified lower bounded date and/or time and a specified upper bounded date and/or time. Such a point-in-time query may provide a client 106 with the ability to target data records for version control, state rollbacks, and/or data analysis. For example, a client 106 may wish to observe the changes of a trained ML model 116 over time. The client 106 may execute various point-in-time queries on the offline data store 148 to retrieve data records having event timestamps and/or write timestamps occurring in various time intervals, train separate ML models 116 using the data, and observe the differences in inferencing, consistency, and the like.

The online data store 148 may be configured to store various data associated with a feature group 144. In some examples, the online data store 148 may store a record and/or values associated with the features 140 of a feature group 144. For example, the online data store 148 may be configured as low-latency, high-availability cache for a feature group 144, enabling real-time lookup of records. In some examples, the online data store 148 may store only the latest record, as identified by the event time, per unique record identifier value of a feature group 144. For example, if the feature store service 104 receives a call to ingest first a record for "CustomerId" of 12345 with an event time of "Nov. 25, 2020, 5:00 pm," followed by a call to ingest a second record for the same "CustomerId" of 12345 with an event time of "Nov. 25, 2020, 6:00 pm," then only the second record with the event time of "Nov. 25, 2020, 6 pm" will be available in the online data store 148. This configuration may provide clients 106 the ability to access features 140 registered with the feature service 104 for real-time inferences (or predictions) with low millisecond latency and high throughput to ensure high performance in production. For example, a client 106 may have a trained ML model 116 hosted on a VM instance 114 executing on one or more computing devices 112 of a computing resource network 110. The trained ML model 116 and/or the VM instance 114 may be configured to query the online data store 148 to retrieve the most recent record associated with a record identifier value and produce an online (real-time) inference 158 by running the trained ML model against the recent record.

Take for example, an example environment 100 including one or more client(s) 106, a service provider network 102, and one or more user(s) 120. In such an example, the client 106 may operate an online store that is accessed by one or more users 120 via one or more user devices 122 and the one or more networks 118. The client 106 may wish to train an ML model 116 to generate real-time recommendations to present to a user 120 via a user interface 160 of the user device 122 when a user 120 accesses the online store. The client 106 may access a feature store service 104 of the service provider network 102 via a client account, a client device 108, and one or more networks 118. The feature store service 104 may receive a request to create a feature group 144 and begin background workflows to create the feature group 144. Additionally, or alternatively, the feature store service 104 may receive a query for a desired feature group 144. The feature store service 104 may also receive requests to register one or more features 140 with the feature store service 104. In some examples, the client 106 may include the one or more features 140 in the feature group 144.

Once the feature group 144 has been created, or otherwise identified, and populated with features 140 and/or records corresponding to the feature group 144, the client 106 may access the historic values 146 for the feature group and use the data to train an ML model 116 configured to generate real-time item recommendations based on a user's 120 activity with the online store. The ML model 116 may be trained using any of the various ML algorithms disclosed herein. Once the ML model 116 has been trained, the client 106 may host the ML model 116 using a computing-resource network 110. Additionally, or alternatively, the client 106 may utilize an event monitoring service and/or the management component 130 of the feature store service 104 to monitor an endpoint executing a service, such as, for example, a VM instance 114 hosting the ML model 116 and executing within the computing-resource network 110, for specific events, such as, for example, a user 120 interaction.

Once an event occurs, such as, for example, the user 120 providing input to the user interface 160 presenting data associated with the online store, the feature store service 104 may begin to receive data, such as records, associated with the feature group used to train the ML model. The feature store service 104 may cause the records to be stored in the most recent values (online) data store 148 associated with the feature group 144. Additionally, or alternatively, the replication engine 132 may cause the records to be replicated into the historic values (offline) data store 146 associated with the feature group 144.

Now, when the ML model 116 needs to produce a real-time inference, the ML model 116 may transmit a recent value query 154, including a record identifier value, to the feature store service 104, where the query component 134 may utilize schema and/or metadata to identify which feature group 144 the ML model 116 has been trained on. The query component 134 may access the most recent values 148 associated with the identified record included in the feature group 144 and may return recent value data 156 for use by the ML model 116 in making real-time predictions, or online inferences 158. In some examples, the recent value data may include the most recent record in the feature group 144 corresponding to the record identifier value. The ML model 116 may then be utilized along with the recent value data 156 to generate an online inference 158, such as the recommended item, and transmit the recommendation to the user device 122 where the recommendation is displayed to the user(s) 120 via the user interface(s) 160.

Generally, the feature store service 104, and components thereof, may comprise software, firmware, and/or other logic that is supported one computing device, or across more computing devices in the service provider network 102. Additionally, the feature store service 104 may comprise a system of other devices, such as software agents stored locally on VM instances.

Figure 2:
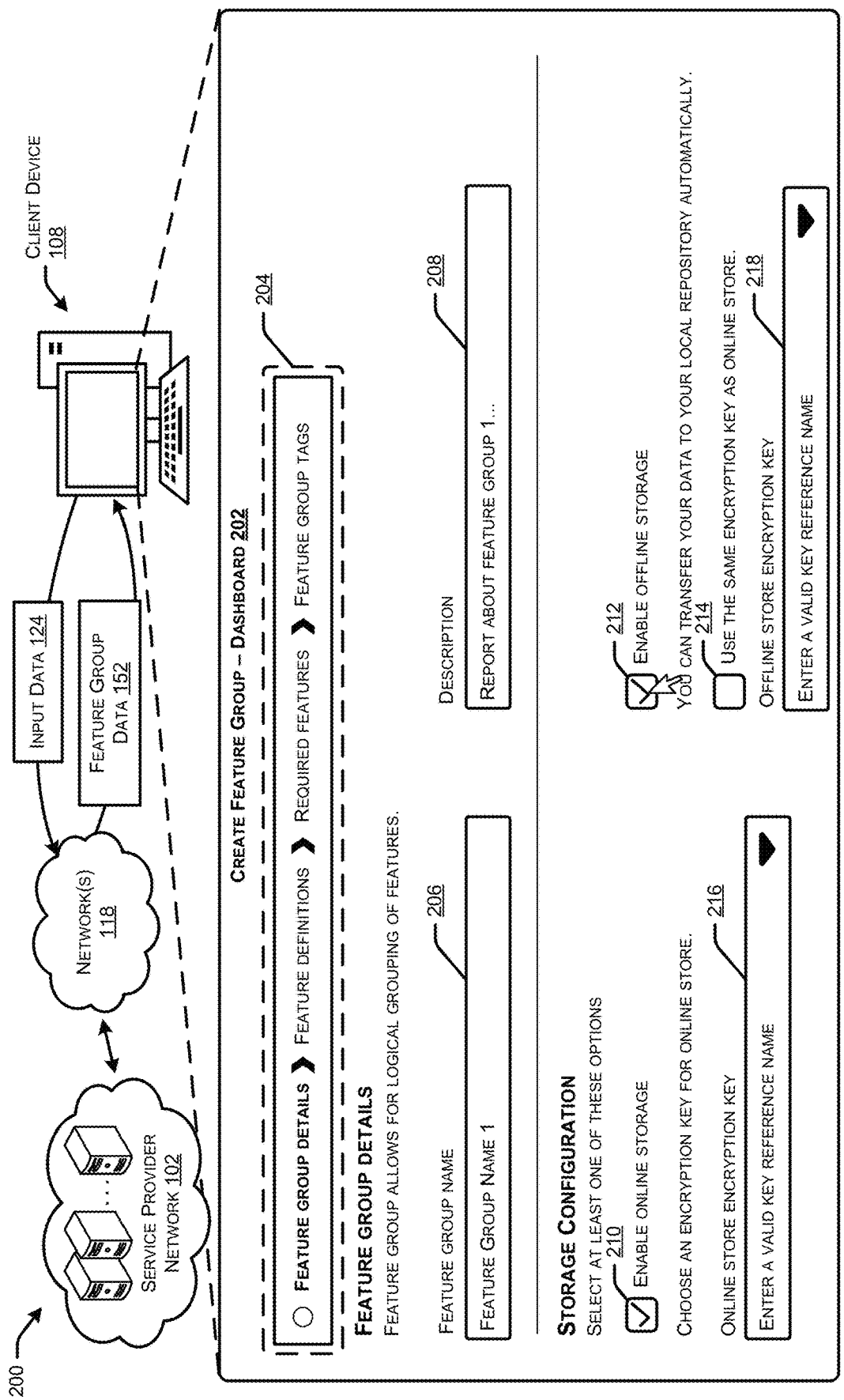
FIG. 2 illustrates a graphical user interface through which a client of a service provider network can create and define a feature grouping, and can also decide to enable a historic values data store (also referred to herein interchangeably as "offline data store") and/or a most recent values data store (also referred to herein interchangeably as "online data store") for such a feature grouping.

FIG. 2 illustrates an environment 200 including a graphical user interface (GUI) 202 through which a client 106 of a service provider network 102 can create and define a feature grouping 144, and can also decide to enable an offline data store 146 and/or a online data store 148 for such a feature grouping 144.

As illustrated, the GUI 202 (also referred to herein interchangeably as "dashboard") may indicate a workflow 204, or steps that a client 106 may follow to create a feature group 144. In this example, the workflow 204 may include an indication that the client 106 is at the "Feature group details" page of the workflow 204. As illustrated, the GUI may indicate various data that is required from the client 106 in order to create the feature group 144. For example, the GUI may include at least a feature group details portion including a feature group name field 206 and/or a description field 208. In some examples, the feature group name field 206 may be configured to receive input specifying the name of the feature group 144. additionally, or alternatively, the description field 208 may be configured to receive input specifying a description of the feature group 144. The input and/or selections made by the client 106 may be sent as input data 124 to the service provider network 102.

Additionally, or alternatively, the GUI may include a storage configuration portion including an enable online storage option 210, an enable offline storage option 212, a same encryption key option 214, an online store encryption key field 216, and/or an offline encryption key field 218. In some examples, the enable online storage option 210 may be configured to receive a selection indicating whether a client would like to opt-in (indicated by a box with a check mark) or opt-out (indicated by a blank box) of the online storage. Additionally, or alternatively, the enable offline storage option 212 may be configured to receive a selection indicating whether a client would like to opt-in (indicated by a box with a check mark) or opt-out (indicated by a blank box) of the offline storage. Additionally, or alternatively, the same encryption key option 214 may be configured to receive a selection indicating whether a client would like to use the same encryption key for offline storage as the encryption key used for online storage (indicated by a box with a check mark) or use a different encryption key for offline storage (indicated by a blank box). Additionally, or alternatively, the online store encryption key field 216 may be configured to receive input and/or a selection specifying an encryption key to be used for encrypting the online storage. Additionally, or alternatively, the offline encryption key field 218 may be configured to receive input and/or a selection specifying an encryption key to be used for encrypting the offline storage. The input and/or selections made by the client 106 may be sent as input data 124 to the service provider network 102.

It should be understood that the GUI 202 is merely illustrative and any type of user interface, or combination of user interfaces, may be utilized to prompt a client 106 for input data 124 for creating and defining a feature group 144. Additionally, any type of input mechanism may be used to receive input that can be used to make selections and/or enter data in fields.

Figure 3:
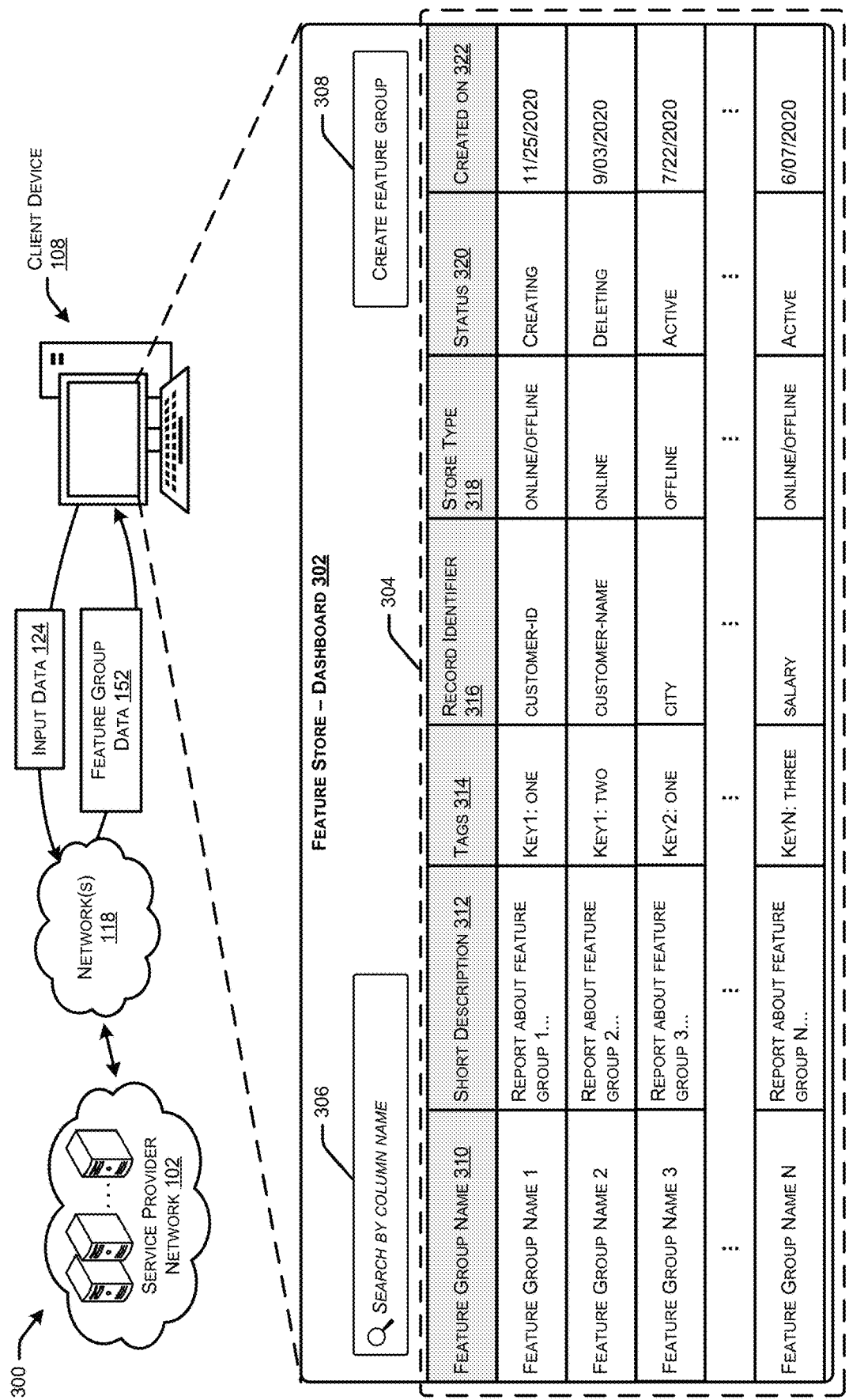
FIG. 3 illustrates a graphical user interface through which a client of a service provider network can view, manage, and discover various curated data and/or feature groupings that have been previously added by other clients.

FIG. 3 illustrates an environment 300 including a GUI 302 through which a client 106 of a service provider network 102 can view, manage, and discover various curated data, features 140, and/or feature groupings 144 that have been previously registered with the feature store service 104.

As illustrated, the GUI 302 may present data associated with features 140 and/or feature groups 144 registered with the service 104. The GUI 302 may include a presentation portion 304 for displaying one or more feature groups 144, a search element 306 configured to receive one or more queries from a client 106 and display data that meets the requirements of the query in the display portion 304, and/or a create feature group element 308 configured to allow a client 106 to create a new feature group 144. In some examples, the presentation portion 304 may display one or more feature groups 144 and associated metadata, such as, for example, a feature group name 310, a short description 312, tags 314 associated with the feature group 144 and/or features included in the feature group 144, a record identifier 316, a data store type 318, a status 320 of the feature group 144, and/or timestamp 322 associated with the feature group 144, such as, for example, a date on which the feature group 144 was created or an event timestamp associated with the feature group.

As previously mentioned, the presentation portion 304 may display rows of metadata associated with feature groups 144. The metadata may include the feature group name 310 of the feature group. Additionally, or alternatively, the metadata may include a short description of the feature group 144, which may include an indication of which ML models 116 the feature group 144 should be used for, for example. Additionally, or alternatively, the metadata may include one or more tags associated with the feature group 144 and/or features 140 included in the feature group 144, for example. Additionally, or alternatively, the metadata may include a record identifier 316, such as a feature 140 that the client 106 has indicated as the record identifier 316 for the feature group 144, for example. Additionally, or alternatively, the metadata may include an indication of the store type 318 associated with the feature group 144, such as if the client 108 has opted-in or opted-out of online and/or offline storage for the feature group, for example. Additionally, or alternatively, the metadata may include an indication of a status 320 of the feature group 144, indicating a current state that the feature group may be in, such as creating, deleting, and/or active, for example. Additionally, or alternatively, the metadata may include an indication of a timestamp 322 associated with the feature group 144, such as, for example, a date on which the feature group 144 was created or an event timestamp associated with the feature group. Additionally, or alternatively, selection of a row associated with a feature group 144 may cause the presentation portion 304 to display additional metadata associated with the feature group 144, such as, for example, code used to compute features 140 included in the feature group 144, feature version information, feature analysis data, and/or feature documentation.

As previously mentioned, the GUI 302 may include a search element 306 configured to receive one or more queries from a client 106 and display data that meets the requirements of the query in the display portion 304, and/or a create feature group element 308. The search element 306 may be configured to receive search queries and search the feature library 138 and/or the feature group library 142 based on any of the metadata associated with a feature 140 and/or a feature group 144. In some examples, a search query may include a feature name, a feature group name, a tag associated with a feature and/or feature group, a record identifier associated with a feature group, and/or any other metadata associated with a feature and/or feature group. The create feature group element 308 may be configured to present a GUI configured to prompt the client 106 for information required to create a feature group 144, such as, for example, a GUI similar to that of the GUI 202 as described with respect to FIG. 2. The input and/or selections made by the client 106 may be sent as input data 124 to the service provider network 102.

It should be understood that the GUI 302 is merely illustrative and any type of user interface, or combination of user interfaces, may be utilized to present features 140, feature groups 144, metadata associated with features 140 and/or feature groups 144, and/or provide clients 106 with the ability to search for features 140 and/or feature groups 144.

Figure 4:
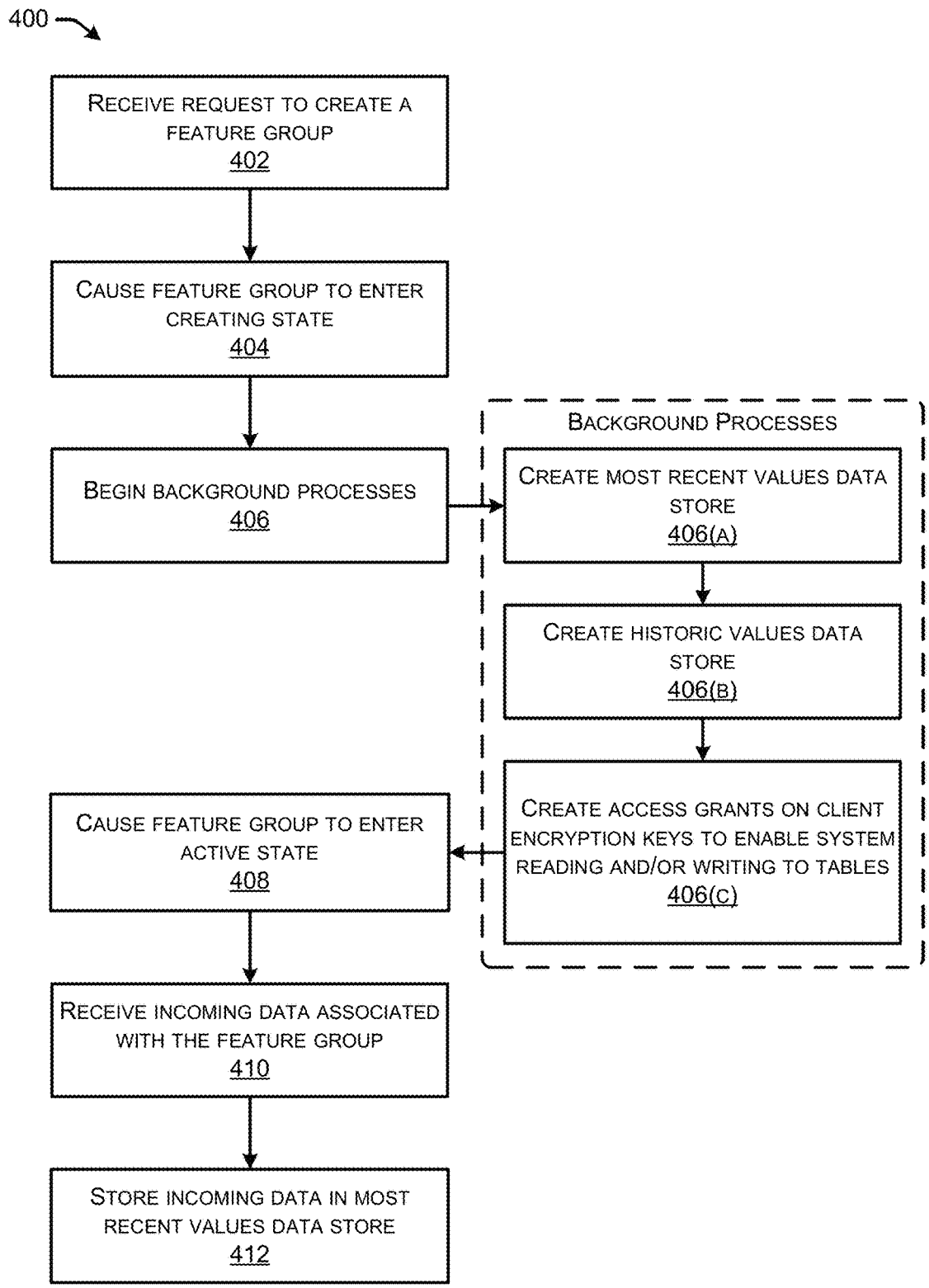
FIG. 4 illustrates a flow diagram of an example method for a service provider network to receive a request to create a feature group, cause the feature group to change between various states, create various data stores for the feature group, and receive curated data to store in association with the feature group.
Figure 5:
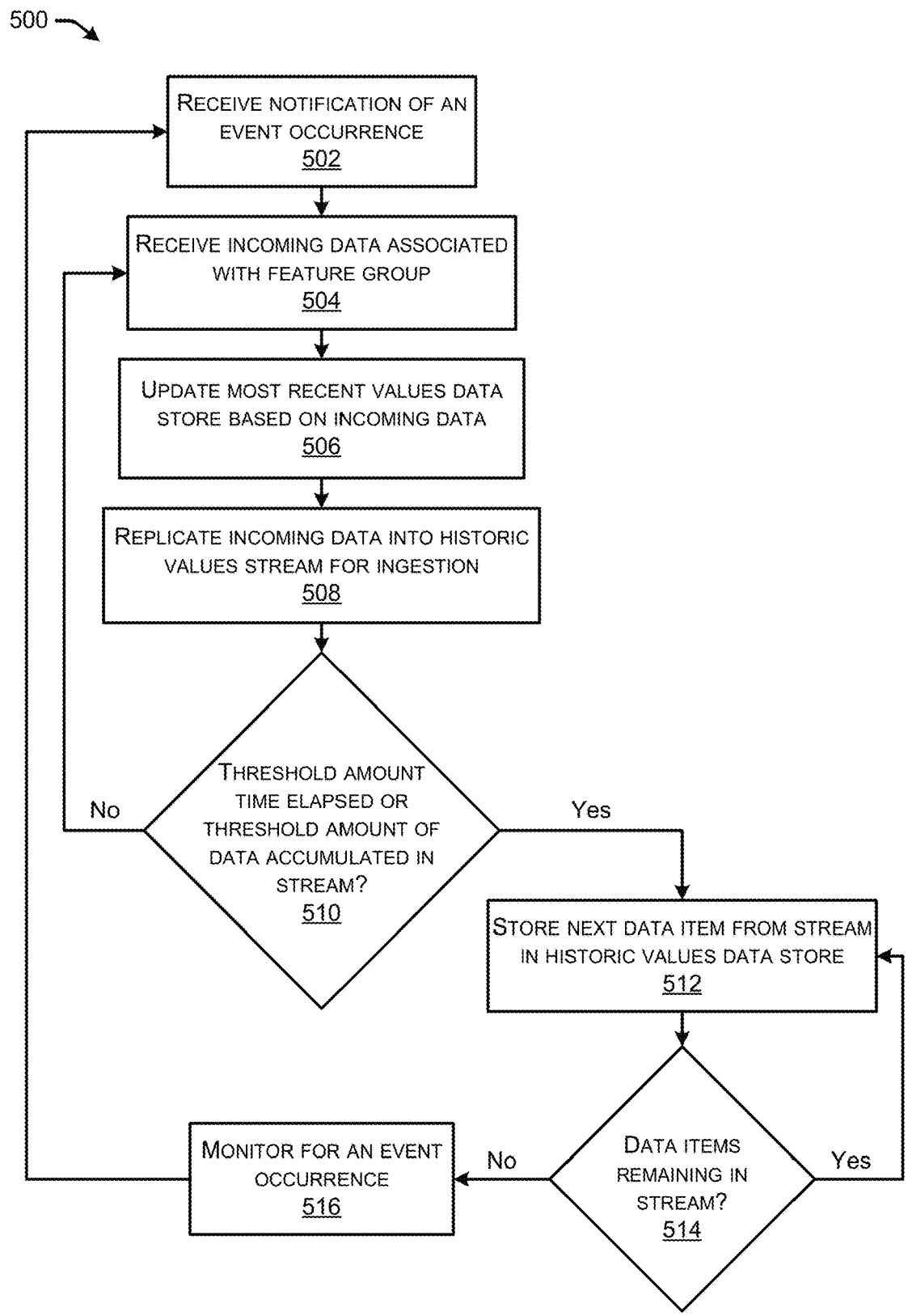
FIG. 5 illustrates a flow diagram of an example method for a service provider network to maintain consistency between curated data stored in a data store configured for training ML models and curated data stored in a data store configured for performing real-time inferences with ML models.

FIGS. 4 and 5 illustrate flow diagrams of example methods 400 and 500 that illustrate aspects of the functions performed at least partly by the service provider network 102 as described in this disclosure. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for a service provider network 102 to receive a request to create a feature group, cause the feature group to change between various states, create various data stores for the feature group, and receive curated data to store in association with the feature group.

At 402, the service provider network 102 may receive a request to create a feature group 144. In some examples, the request may be sent from a client device 108 via one or more networks 118. Additionally, or alternatively, the request may include various data configured to define the feature group 144. Additionally, or alternatively, the service provider network 102 and the client device 108 may exchange various data prompting the client 106 to define the feature group 144. Additionally, or alternatively, the service provider network 102 and the client device 108 may exchange the data prompting the client to define the feature group 144 while background processes 406(A)-(C) are executing.

At 404, the service provider network 102 may cause the feature group to enter a creating state. When the feature group 144 transitions to the creating state, the feature store service 104 may be notified to begin various automated background processes required to establish the feature group 144.

At 406, the service provider network 102 may begin execution of the background processes 406(A)-(C). While background processes 406(A)-(C) are included, it should be appreciated that these background processes 406(A)-(C) may be executed in any order. Additionally, or alternatively, any number of additional background processes 406 described herein may also be executed as a at least a portion of the process 400.

At 406(a), the service provider network 102 may create an online data store 148 for the feature group 144. In some examples, the online data store 148 may be configured to store only the most recent values associated with the feature group 144, such as, for example, the record associated with the feature group 144 having the most recent event time.

At 406(b), the service provider network 102 may create an offline data store 146 for the feature group 144. In some examples, the offline data store 146 may be configured to store historic values associated with the feature group 144, such as, for example, all of the records associated with the feature group 144.

At 406(c), the service provider network 102 may create access grants on client encryption keys. In some examples, creating access grants on the client encryption keys may provide the system 104 with access to read and/or write data to tables included in the online data store 148, tables included in the offline data store 146, and or any other table associated with a client account registered with the service provider network 102. Once the service provider network 102 has concluded the background processes 406(a)-(c), the service provider network 102 may cause the feature group 144 to transition to an active state.

At 408, the service provider network 102 may cause the feature group 144 to transition from the creating state to the active state. Once in the active state, the service provider network 102 may begin to register new features 140 and/or previously registered features 140 with the feature group 144.

At 410, the service provider network 102 may receive incoming data associated with the feature group 144, such that the incoming data includes a record identifier value that is associated with the feature group 144. In some examples, the incoming data may include a record associated with the feature group 144. In some examples, the incoming data may be received from the client device 108. Additionally, or alternatively, the incoming data may be received from a computing-resource network 110 configured to monitor for events and transmit data corresponding to the event to the service provider network 102.

At 412, the service provider network 102 may store the incoming data in the online data store 148. In some examples, the incoming data may correspond to an event time that occurred subsequent to an event time associated with previous data that was stored in the recent values data store 148. As such, the previous data may be replaced in the online data store 148 by the incoming data, such that the online data store 148 contains the most recent values associated with the record based on the event time of the record. Additionally, or alternatively, the previous data may be replicated to the offline data store 146 using any of the replication techniques as described with respect to FIGS. 1 and 5.

FIG. 5 illustrates a flow diagram of an example method 500 for a service provider network 102 to automatically maintain consistency between curated data stored in a data store configured for training ML models 116, such as, for example, the offline data store 146, and curated data stored in a data store configured for performing real-time inferences 158 with ML models 116, such as, for example, the online data store 148.

At 502, the service provider network 102 may receive a notification of an event occurrence. In some examples, the notification may be transmitted to the service provider network 102 from a computing-resource network 110 via one or more network(s) 118. In some examples, the computing-resource network 110, or a component and/or virtual resource included therein, may be configured to monitor a service for an event, such as, for example, a user 120 accessing an online store.

At 504, the service provider network 102 may receiving incoming data associated with a feature group 144, such that the incoming data includes a record identifier value that is associated with the feature group 144. In some examples, the incoming data may include a record associated with the feature group 144. In some examples, the incoming data may be received from the client device 108. Additionally, or alternatively, the incoming data may be received from the computing-resource network 110 configured to monitor for events and transmit data corresponding to the event to the service provider network 102.

At 506, the service provider network 102 may store the incoming data in the online data store 148 associated with the feature group. In some examples, the incoming data may correspond to an event time that occurred subsequent to an event time associated with previous data that was stored in the recent values data store 148. As such, the previous data may be replaced in the online data store 148 by the incoming data, such that the online data store 148 contains the most recent values associated with the record based on the event time of the record.

At 508, the service provider network 102 may then replicate the incoming data such that the replicated data is included in a data stream for ingestion into the offline data store 146 associated with the feature group 144. The service provider network 102 may then be configured to wait for a threshold amount of time to elapse and/or for a threshold amount of data to accumulate in the ingestion stream. In a non-limiting example, the threshold amount of time and/or the threshold amount of data may be specified by the client 106, such as, for example, a threshold amount of time as 5 minutes and a threshold amount of data as 6 megabytes (MB). It should be appreciated that client(s) 106 may set the time threshold to any measurement of time and/or the data threshold to any measurement of data. During this wait period, the service provider network 102 may further receive incoming data and repeat the steps previously performed, such as, for example, steps 504 and/or 506.

In some examples, step 506 may be executed before step 508. Additionally, or alternatively, step 508 may be executed before step 506, such that incoming data may be stored first in the offline data store and subsequently replicated into the online data store. Additionally, or alternatively, steps 506 and 508 may be executed simultaneously.

At 510, the service provider network 102 may make a determination as to whether a threshold has been reached. In some examples, the service provider network 102 may determine if the threshold amount of time has elapsed and/or if a threshold amount of data has been accumulated in the stream. If none of the thresholds have been reached, the service provider network 102 may wait and/or perform other processes until a threshold is achieved. Additionally, or alternatively, if one or more thresholds have been reached, the service provider network 102 may begin sequentially storing the data items from the stream into the offline data store 146 associated with the feature group 144.

At 512, the service provider network 102 may begin sequentially storing the data items from the stream into the offline data store 146 associated with the feature group 144. Once the service provider network 102 has stored an item rom the stream into the offline data store 146, the service provider network 102 may make a determination as to whether or not data remains in the stream.

At 514, the service provider network 102 may make a determination as to whether or not data remains in the stream. In some examples, the service provider network 102 may determine that one or more data items remain in the stream. As such, the service provider network may repeat step 512 and store the next data item in the stream into the offline data store 146 before making another determination at 514. Additionally, or alternatively, the service provider network 102 may determine that there are no more data items remaining in the stream. As such, the service provider network 102 may begin to monitor, or otherwise wait for a notification of a subsequent event occurrence.

At 516, the service provider network 102 may begin to monitor for an event occurrence. In some examples, the service provider network 102 may receive a notification of an event occurrence from a computing resource network 110 configured to monitor for such an event occurrence, as described above with respect to FIG. 1.

Figure 6:
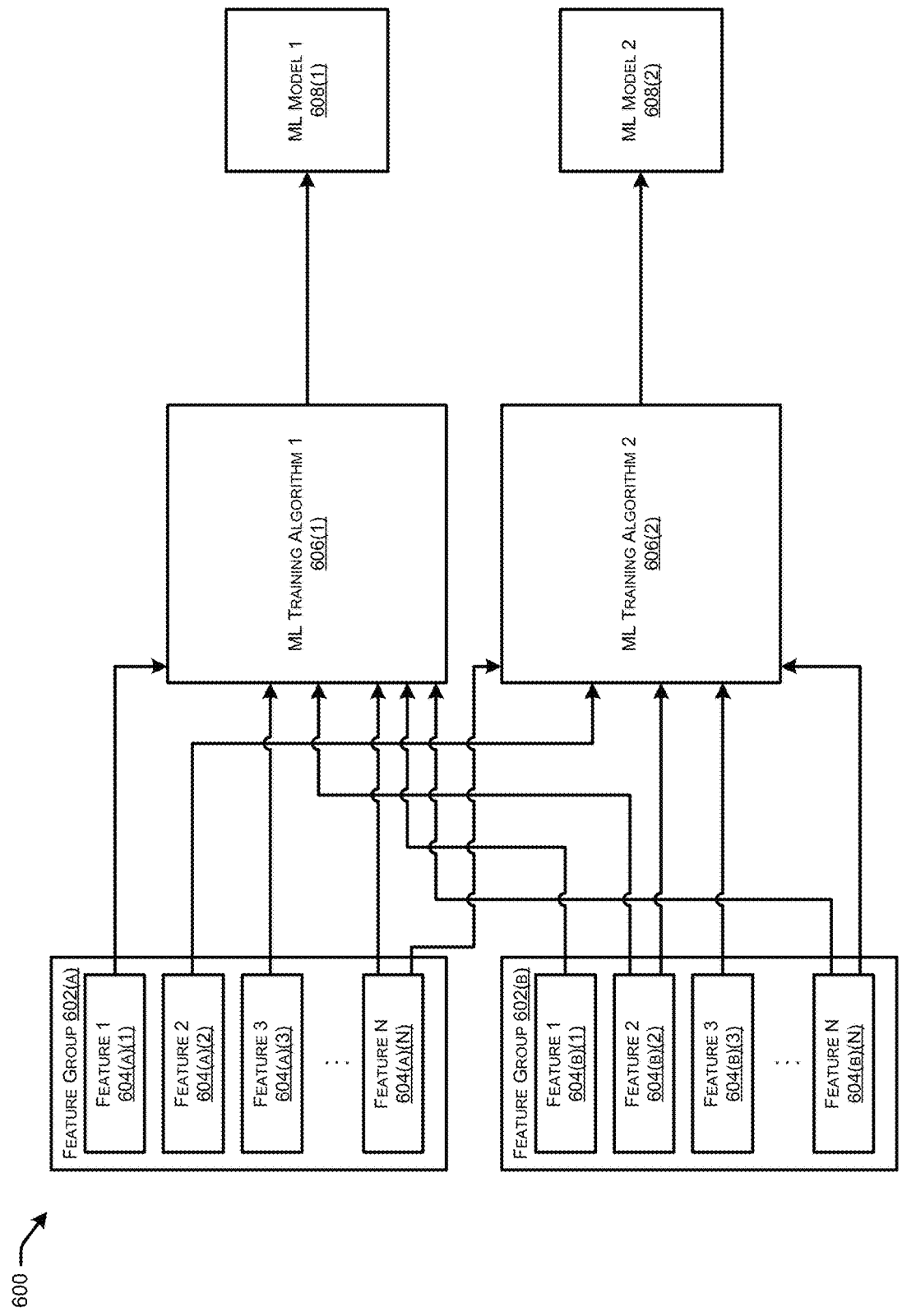
FIG. 6 illustrates an example diagram of utilizing the data managed by the service provider network in various combinations to train ML models.

FIG. 6 illustrates an example diagram 600 of utilizing the data managed by the service provider network 102 in various combinations to train ML models. In some examples, the feature groups 602($a$), 602($b$) may include any number of the components of the feature groups 144 as previously described with respect to FIGS. 1-5. Additionally, or alternatively, the features 604($a$)(1)-(N), 604($b$)(1)-(N) may include any number of the components of the features 140 as previously described with respect to FIGS. 1-5. Additionally, or alternatively, the ML training algorithms 606(1) and 606(2) may include any of the ML training algorithms as previously described with respect to FIGS. 1-5. Additionally, or alternatively, the ML models 608(1) and 608(2) may include any number of the components of the ML models 116 as previously described with respect to FIGS. 1-5.

As illustrated, a first feature group 602($a$) may include one or more first features 604($a$)(1)-(N), and a second feature group 602($b$) may include one or more second features 604($b$)(1)-(N). In some examples, any number of feature groups containing any number of features may be contemplated. The features 604 may contain information about an entity or activity that may be as an input that an ML training algorithm 606 may use to train one or more ML models 608. In some examples, the features 604 of a feature grouping 602 may be utilized by different ML training algorithms, such as, ML training algorithm 1 606(1) and ML training algorithm 2 606(2) to train different ML models, such as, ML model 1 608(1) and ML model 2 608(2). For example, ML training algorithm 1 608(1) may use first feature 1 604($a$)(1), first feature 3 604($a$)(3), first feature N 604($a$)(N), second feature 1 604($b$)(1), second feature 2 604($b$)(2), and/or second feature N 604($b$)(N) from the feature groups 602 as input to train ML model 1 608(1). Additionally, or alternatively, ML training algorithm 2 608(2) may use first feature 2 604($a$)(2), first feature N 604($a$)(N), second feature 2 604($b$)(2), second feature 3 604($b$)(3), and second feature N 604($b$)(N) from the feature groups 602 as input to train ML model 2 608(2). In this example, the ML training algorithms 606 may train different ML models 608 even though some similar features, such as second feature 2 604($b$)(2) and/or first feature N 604($a$)(N), which are utilized in training both of the models 608.

Figure 7:
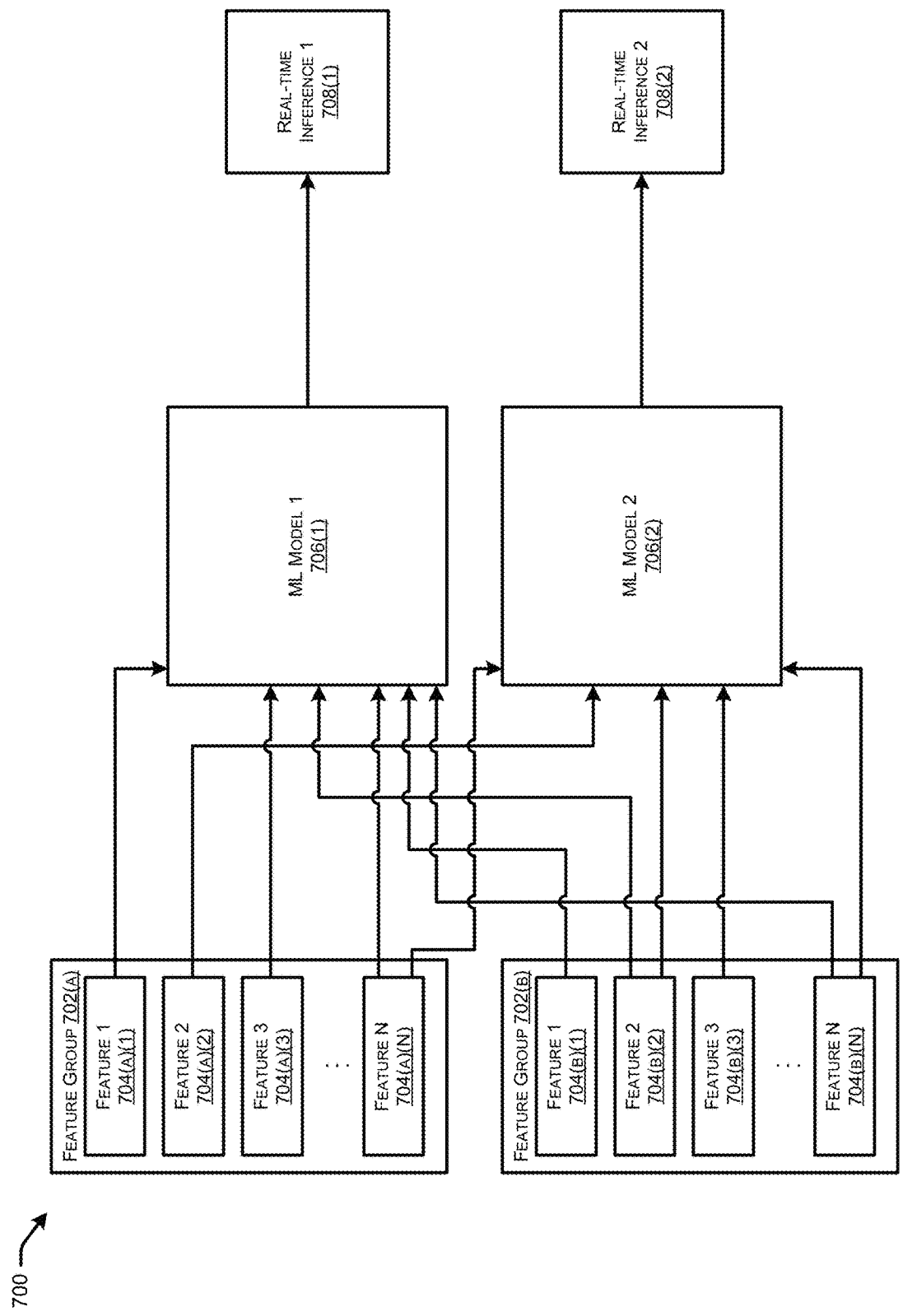
FIG. 7 illustrates an example diagram of utilizing the data managed by the service provider network in various combination to perform real-time inferences using trained ML models.

FIG. 7 illustrates an example diagram 700 of utilizing the data managed by the service provider network 102 in various combination to perform real-time inferences using trained ML models. In some examples, the feature groups 702($a$), 702($b$) may include any number of the components of the feature groups 144, 602 as previously described with respect to FIGS. 1-6. Additionally, or alternatively, the features 704($a$)(1)-(N), 704($b$)(1)-(N) may include any number of the components of the features 140, 604(1)-(N) as previously described with respect to FIGS. 1-6. Additionally, or alternatively, the ML models 706(1) and 706(2) may include any number of the components of the ML models 116, 608 as previously described with respect to FIGS. 1-6. Additionally, or alternatively, the real-time inferences 708

(1) and 708(2) may include any number the components of the real-time inferences 158 as previously described with respect to FIGS. 1-5.

As illustrated, a first feature group 702(a) may include one or more first features 704(a)(1)-(N), and a second feature group 702(b) may include one or more second features 704(b)(1)-(N). In some examples, any number of feature groups containing any number of features may be contemplated. The features 704 may contain information about an entity or activity that may be used as an input that an ML model 706 may use to make a prediction, or an online inference 708. In some examples, the features 704 of a feature grouping 702 may be utilized by different ML models, such as, ML model 1 706(1) and ML model 2 706(2) to generate different real-time inferences, such as, real-time inference 1 708(1) and real-time inference 2 708(2). For example, ML model 1 706(1) may use first feature 1 704(a)(1), first feature 3 704(a)(3), first feature N 704(a)(N), second feature 1 704(b)(1), second feature 2 704(b)(2), and/or second feature N 704(b)(N) from the feature groups 702 as input to generate real-time inference 1 708(1). Additionally, or alternatively, ML model 2 706(2) may use first feature 2 704(a)(2), first feature N 704(a)(N), second feature 2 704(b)(2), second feature 3 704(b)(N), and second feature N 704(b)(N) from the feature groups 702 as input to generate real-time inference 2 708(2). In this example, the ML models 706 may generate different real-time inferences 708 even though some similar features, such as second feature 2 704(b)(2) and/or first feature N 704(a)(N), which are utilized in generating both of the real-time inferences 708.

FIGS. 8A-9 illustrate flow diagrams of example methods 800 and 900 that illustrates aspects of the functions performed at least partly by the service provider network 102 as described in this disclosure. The logical operations described herein with respect to FIGS. 8A-9 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 8A-9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 8B:
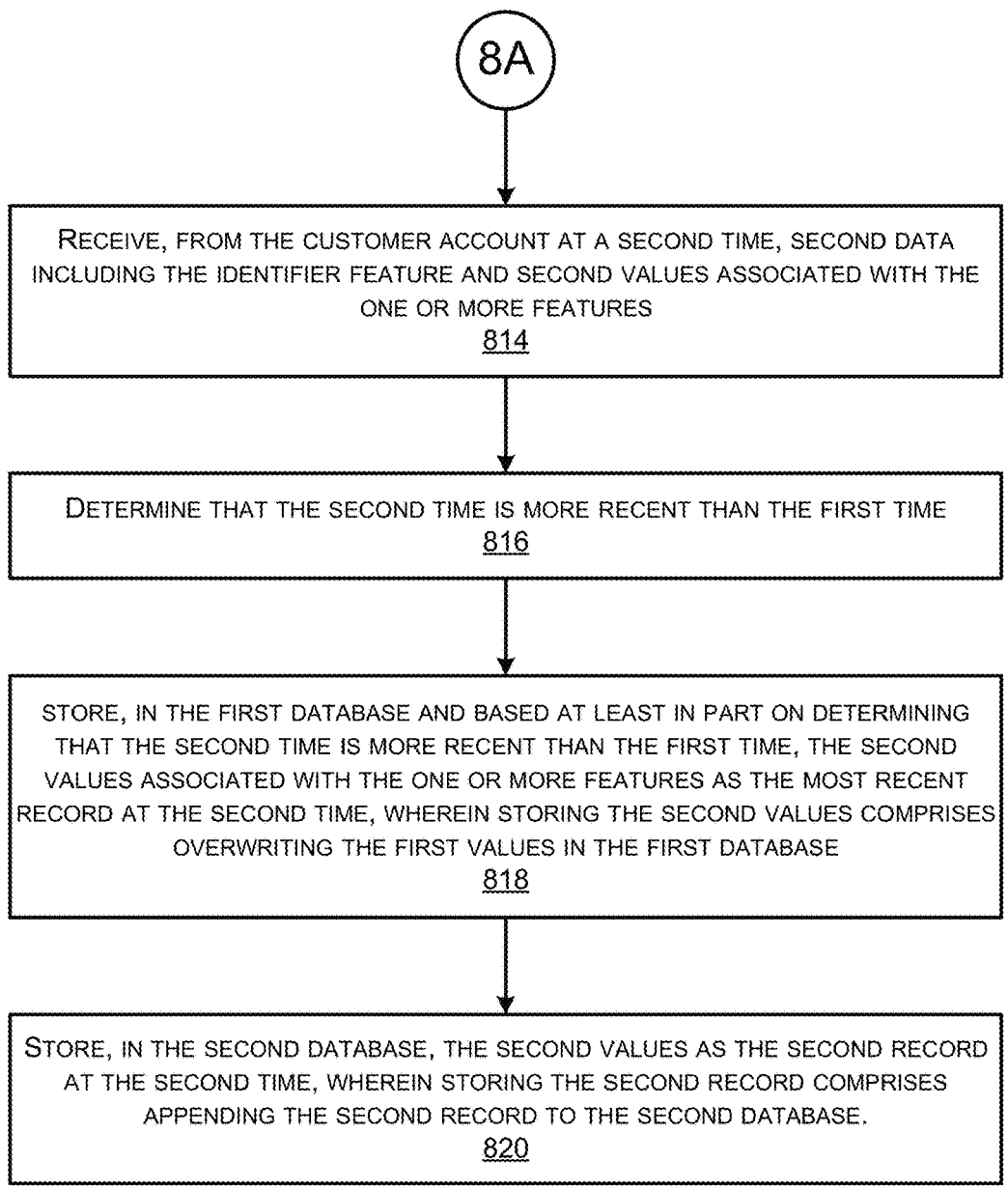

FIGS. 8A and 8B collectively illustrate a flow diagram of an example method 800 for a service provider network 102 to receive input data 124 representing a request to create a feature group 144, create an offline data store 146 and an online data store 148 for the feature group, and store curated data corresponding to features 140 associated with the feature group 144 in such a manner to maintain consistency between the online data store 148 and the offline data store 146.

At 802, a service provider network 102 may receive a request to create a feature group 144. In some examples, the request may be received from a customer account registered with the service provider network 102. Additionally, or alternatively, the feature group 144 may indicate one or more features 140 included in the feature group 144. Additionally, or alternatively, a feature 140 of the one or more features 140 may be configured as an identifier feature. In some examples, the identifier feature may be configured to identify a record for storing data associated with the feature group 144.

At 804, the service provider network 102 may create a first database associated with the customer account. In some examples, the first database may be associated with the feature group 144. Additionally, or alternatively, the first database may be configured to store data representing a most recent record including values associated with the one or more features 140 in the feature group 144. Additionally, or alternatively, the first database may be configured as the online database 148.

At 806, the service provider network 102 may create a second database associated with the customer account. In some examples, the second database may be associated with the feature group 144. Additionally, or alternatively, the second database may be configured to store data representing one or more records including values associated with one or more features 140 in the feature group 144. Additionally, or alternatively, the second database may be configured as the offline database 146.

At 808, the service provider network 102 may receive first data including the feature identifier. In some examples, the first data may be received from the customer account. Additionally, or alternatively, the first data may be received from a computing-resource network 110 associated with the service provider network 102. Additionally, or alternatively, the first data may be received at a first time. Additionally, or alternatively, the first data may indicate first values associated with the one or more features 140 included in the feature group 144. Additionally, or alternatively, the feature identifier may identify a record associated with the feature group 144.

At 810, the service provider network 102 may store the first values associated with the one or more features 140 included in the feature group 144. In some examples, the service provider network 102 may store the first values in the first database. Additionally, or alternatively, the service provider network 102 may store the first values as the most recent record at the first time. Additionally, or alternatively, the service provider network 102 may utilize any of the data replacement techniques describe previously with respect to FIG. 1 to store the first values in the first database.

At 812, the service provider network 102 may store the first values associated with the one or more features 140 included in the feature group 144. In some examples, the service provider network 102 may store the first values in the second database. Additionally, or alternatively, the service provider network 102 may store the first values as a first record at the first time. Additionally, or alternatively, the service provider network 102 may utilize any of the replication techniques described previously with respect to FIGS. 1 and 5 to store the first values in the second database.

At 814, the service provider network 102 may receive second data including the feature identifier. In some examples, the second data may be received from the customer account. Additionally, or alternatively, the second data may be received from a computing-resource network 110 associated with the service provider network 102. Additionally, or alternatively, the second data may be received at a second time. Additionally, or alternatively, the second time may be a more recent time than the first time, such that the second time is subsequent to the first time. Additionally, or alternatively, the second data may indicate second values associated with the one or more features 140 included in the feature group 144. Additionally, or alternatively, the feature identifier may identify a record associated with the feature group 144.

At 816, the service provider network 102 may determine that the second time is more recent than the first time.

At 818, the service provider network 102 may store the second values associated with the one or more features 140 included in the feature group 144. In some examples, the service provider network 102 may store the second values based at least in part on determining that the second time is more recent than the first time. In some examples, the service provider network 102 may store the second values in the first database. Additionally, or alternatively, the service provider network 102 may store the second values as the most recent record at the second time. Additionally, or alternatively, the service provider network 102 may overwrite the first values in the first database with the second values. Additionally, or alternatively, the service provider network 102 may utilize any of the data replacement techniques describe previously with respect to FIG. 1 to store the second values in the first database.

At 820, the service provider network 102 may store the second values associated with the one or more features 140 included in the feature group 144. In some examples, the service provider network 102 may store the second values in the second database. Additionally, or alternatively, the service provider network 102 may store the second values as a second record at the second time. Additionally, or alternatively, the service provider network may append the second values to the second database, such that the first values remain stored as a first record at a first time, and the second values are stored as a second record at a second time. Additionally, or alternatively, the service provider network 102 may utilize any of the replication techniques described previously with respect to FIGS. 1 and 5 to store the first values in the second database.

In some examples, the method 800 may further include the service provider network 102 receiving a search query. In some examples, the search query may include the record identifier value. Additionally, or alternatively, the search query may include a name associated with a feature 140 and/or a feature group 144. Additionally, or alternatively, the search query may include a tag value associated with at least one feature 140 included in the feature group 144. Additionally, or alternatively, the search query may include a third time and/or a fourth time. In some examples, the third time may be configured as a lower bound and the fourth time may be configured as an upper bound. In some examples, the service provider network 102 may identify one or more records having a fifth time that is more recent than the third time and/or less recent than the fourth time.

In some examples, the method 800 may further include the service provider network 102 receiving a first encryption key associated with the first data store. Additionally, or alternatively, the method 800 may further include the service provider network 102 receiving a second encryption key associated with the second data store. In some examples, the service provider network 102 may receive the first encryption key and/or the second encryption key from the customer account.

In some examples, the customer account may be configured as a first account associated with a first entity. Additionally, or alternatively, the method 800 may include the service provider network 102 receiving third data including the identifier feature. In some examples, the third data may indicate third values associated with the one or more features. Additionally, or alternatively, the service provider network 102 may receive the third data from a second customer account associated with the first entity. Additionally, or alternatively the service provider network 102 may receive the third data including the first encryption key and/or the second encryption key. Additionally, or alternatively, the service provider network 102 may receive the third data at a third time. Additionally, or alternatively the method 800 may include the service provider network 102 storing the third values associated with the one or more features 140 included in the feature group 144. In some examples, the service provider network 102 may store the third values based at least in part on determining that the third time is more recent than the second time. In some examples, the service provider network 102 may store the third values in the first database. Additionally, or alternatively, the service provider network 102 may store the third values as the most recent record of values at the third time. Additionally, or alternatively, the service provider network 102 may overwrite the second values in the first database with the third values. Additionally, or alternatively, the service provider network 102 may utilize any of the data replacement techniques describe previously with respect to FIG. 1 to store the third values in the first database.

In some examples, the customer account may be configured as a first account associated with a first entity. Additionally, or alternatively, the method 800 may include the service provider network 102 receiving third data including the identifier feature. In some examples, the third data may indicate third values associated with the one or more features. Additionally, or alternatively, the service provider network 102 may receive the third values from a second customer account associated with a second entity that is different from the first entity. Additionally, or alternatively, the service provider network 102 may receive a third encryption key and/or a fourth encryption key that is different from the first encryption key and/or the second encryption key. In some examples, the service provider network may refrain from storing the third data.

In some examples, the request to create the feature group may include metadata associated with the feature group. Additionally, or alternatively, the method 800 may include creating a crawler associated with the feature group. In some examples, creating the crawler may be based at least in part on the request to create the feature group. Additionally, or alternatively, the crawler may be configured to create one or more table definitions based at least in part on the metadata. Additionally, or alternatively, creating at least one of the first database and/or the second database may be based at least in part on the one or more table definitions.

FIG. 9 illustrates a flow diagram of an example method 900 for a service provider network 102 to receive and store input data 124 associated with a feature group 144 in such a manner to maintain consistency between an online data store 148 and an offline data store 146 associated with the feature group 144.

At 902, a service provider network 102 may receive first data including an identifier feature and indicating at least a first value associated with a first feature 140 included in a feature group 144 associated with the identifier feature. Additionally, or alternatively, the service provider network 102 may receive the first data from a computing-resource network 110 associated with the service provider network 102. In some examples, the service provider network 102 may receive the first data at a first time and/or from a customer account registered with a service provider 102.

At 904, the service provider network 102 may store the first value associated with the first feature 140 as a most recent record at the first time. In some examples, the service provider network 102 may store the first value in a first database associated with the customer account. Additionally, or alternatively, the first database may be configured to store data representing the most recent record associated with the feature group 144. Additionally, or alternatively, the service provider network 102 may utilize any of the data replacement techniques describe previously with respect to FIG. 1 to store the first value in the first database.

At 906, the service provider network 102 may store the first value associated with the first feature 140 as a first record at the first time. In some examples, the service provider network 102 may store the first value in a second database associated with the customer account. Additionally, or alternatively, the second database may be configured to store data representing one or more records associated with the feature group 144. Additionally, or alternatively, the service provider network 102 may utilize any of the replication techniques described previously with respect to FIGS. 1 and 5 to store the first value in the second database.

At 908, the service provider network 102 may receive second data including the identifier feature and indicating at least a second value associated with the first feature 140. In some examples, the service provider network 102 may receive the second data from the customer account. Additionally, or alternatively, the service provider network 102 may receive the second data at a second time. Additionally, or alternatively, the service provider network 102 may receive the second data from a computing-resource network 110 associated with the service provider network 102.

At 910, the service provider network 102 may store the second value associated with the first feature 140 as the most recent record at the second time. In some examples, the service provider network 102 may store the second value in the first database. Additionally, or alternatively, the service provider network 102 may store the second value based at least in part on determining that the second time is more recent than the first time. Additionally, or alternatively, the service provider network 102 may utilize any of the data replacement techniques describe previously with respect to FIG. 1 to store the first value in the first database At 912, the service provider network 102 may store the second value as a second record at the second time. In some examples, the service provider network 102 may store the second value in the second database. Additionally, or alternatively, the service provider network 102 may utilize any of the replication techniques described previously with respect to FIGS. 1 and 5 to store the first value in the second database.

In some examples, the method 900 may further include the service provider network 102 receiving a first query including a target identifier feature indicating a target feature group 144. In some examples, the first query may be received from the customer account. Additionally, or alternatively, the method 900 may further include the service provider network 102 identifying the target feature group 144 based at least in part on the target identifier feature. Additionally, or alternatively, the method 900 may further include the service provider network 102 generating a graphical user interface (GUI) including the target feature group 144. Additionally, or alternatively, the method 900 may further include the service provider network 102 causing the GUI to be displayed on a computing device associated with the customer account.

In some examples, the method 900 may further include the service provider network 102 receiving a second query including a target feature. In some examples, the service provider network 102 may receive the second query from the customer account. Additionally, or alternatively, the method 900 may further include the service provider network 102 identifying the target feature. In some examples, the service provider network 102 may identify the target feature based at least in part on the second query and/or the target feature group 144. Additionally, or alternatively, the method 900 may further include the service provider network 102 generating a second GUI that includes the target feature. Additionally, or alternatively, the method 900 may further include the service provider network 102 causing the GUI to be displayed on the computing device associated with the customer account.

In some examples, the first feature 140 may be associated with a tag. In some examples, the method 900 may further include the service provider network 102 receiving, from the customer account, a query including the tag. Additionally, or alternatively, the method 900 may further include the service provider network 102 identifying the first feature 140. In some examples, the service provider network 102 may identify the first feature 140 in the second data store and/or based at least in part on the tag. Additionally, or alternatively, the method 900 may further include the service provider network 102 generating a graphical user interface (GUI) including the first feature 140. Additionally, or alternatively, the method 900 may further include the service provider network 102 causing the GUI to be displayed on a computing device associated with the customer account.

In some examples, the first time may comprise a first event time, a first write time, and/or a first invocation time. In some examples, the method 900 may further include the service provider network 102 receiving, from the customer account, a query including a target identifier feature and a request for a third value stored between a third time and a fourth time. Additionally, or alternatively, the method 900 may further include the service provider network 102 identifying a target feature group 144 based at least in part on the target identifier feature. Additionally, or alternatively, the method 900 may further include the service provider network 102 identifying, in the second datastore, the third value associated with the first feature 140 as a third record, wherein the third record has at least one of a fifth event time, a fifth write time, or a fifth invocation time subsequent to the third time and prior to the fourth time. Additionally, or alternatively, the method 900 may further include the service provider network 102 sending, to the customer account, the third value as the third record.

In some examples, the customer account may be a first customer account associated with an entity. Additionally, or alternatively, the first customer account may have a first level of access. In some examples, the method 900 may further include the service provider network 102 receiving, from a second customer account registered with the service provider and associated with the entity at a third time, third data including the identifier feature, the third data indicating a third value associated with the first feature 140. Additionally, or alternatively, the method 900 may further include the service provider network 102 determining that the second customer account has a second level of access that is less than the first level of access. Additionally, or alternatively, the method 900 may further include the service provider network 102 determining to refrain from storing the third value associated with the first feature 140 in the first datastore and/or the second datastore, based at least in part on determining that the second customer account has the second level of access.

In some examples, the first database may be associated with a first encryption key. Additionally, or alternatively, the second database may be associated with a second encryption key. Additionally, or alternatively, the first encryption key may be different from the second encryption key.

In some examples, the feature group 144 may be a first feature group 144 associated with a first encryption key and the identifier feature may be a first identifier feature. In some examples, the method 900 may further include the service provider network 102 receiving, from the customer account at a third time, third data including a second identifier feature and the first encryption key and indicating a third value associated with a second feature 140 included in a second feature group 144 associated with the second identifier feature. Additionally, or alternatively, the method 900 may further include the service provider network 102 determining that the first encryption key is different from a second encryption key associated with the second feature group 144. Additionally, or alternatively, the method 900 may further include the service provider network 102 determining to refrain from storing the third value associated with the second feature 140 in association with the second feature group 144, based at least in part on determining that the first encryption key is different from the second encryption key.

Figure 10:
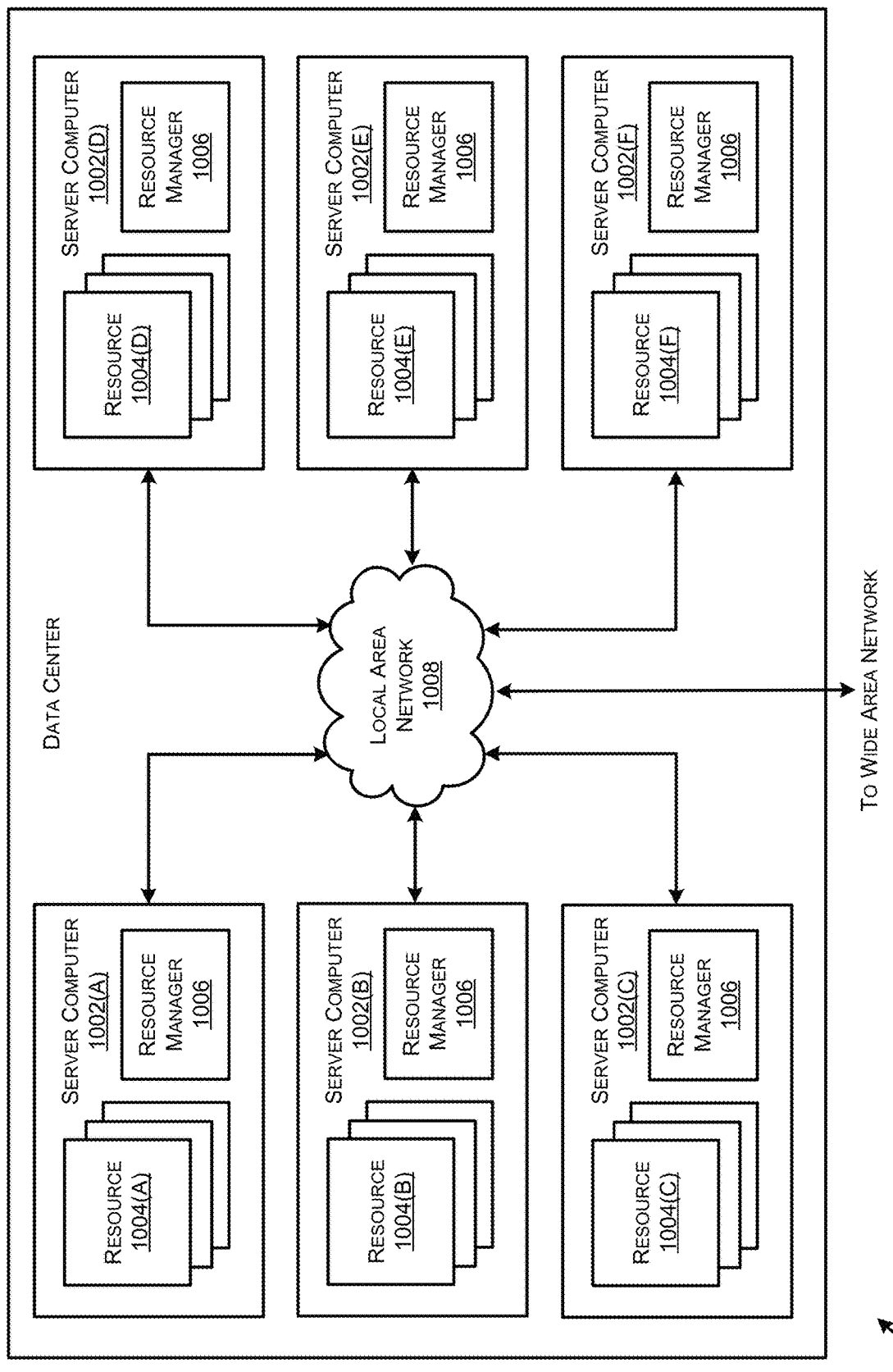
FIG. 10 is a computing system diagram illustrating a configuration for a data center that can be utilized to implement aspects of the technologies disclosed herein.

FIG. 10 is a computing system diagram that illustrates one configuration for a data center 1000 that may implement aspects of the technologies disclosed herein. The example data center 1000 shown in FIG. 10 includes several server computers 1002A-1002F (which might be referred to herein singularly as "a server computer 1002" or in the plural as "the server computers 1002") for providing computing resources 1004A-1004E. In some examples, the resources 1004 and/or server computers 1002 may include, be included in, or correspond to, the computing resources 104 described herein.

The server computers 1002 can be standard tower, rackmount, or blade server computers configured appropriately for providing the computing resources described herein (illustrated in FIG. 10 as the computing resources 1004A-1004E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1002 can also be configured to execute a resource manager 1006 capable of instantiating and/or managing the computing resources. In the case of VM instances, for example, the resource manager 1006 can be a hypervisor or another type of program configured to enable the execution of multiple VM instances on a single server computer 1002. Server computers 1002 in the data center 1000 can also be configured to provide network services and other types of services.

In the example data center 1000 shown in FIG. 10, an appropriate LAN 1008 is also utilized to interconnect the server computers 1002A-1002F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of multiple data centers, between each of the server computers 1002A-1002F in each data center 1000, and, potentially, between computing resources in each of the server computers 1002. It should be appreciated that the configuration of the data center 1000 described with reference to FIG. 9 is merely illustrative and that other implementations can be utilized.

One or more of the server computers 1002 shown in the example data center may be configured to execute some or all of the software components described above. For example, and without limitation, the server computers 1002 can be configured to execute components, including the components of the feature store service 104, the computing-resource network 110, and/or the other software components described above. The server computers 1002 can also be configured to execute other components and/or to store data for providing some or all of the functionality described herein.

Figure 11:
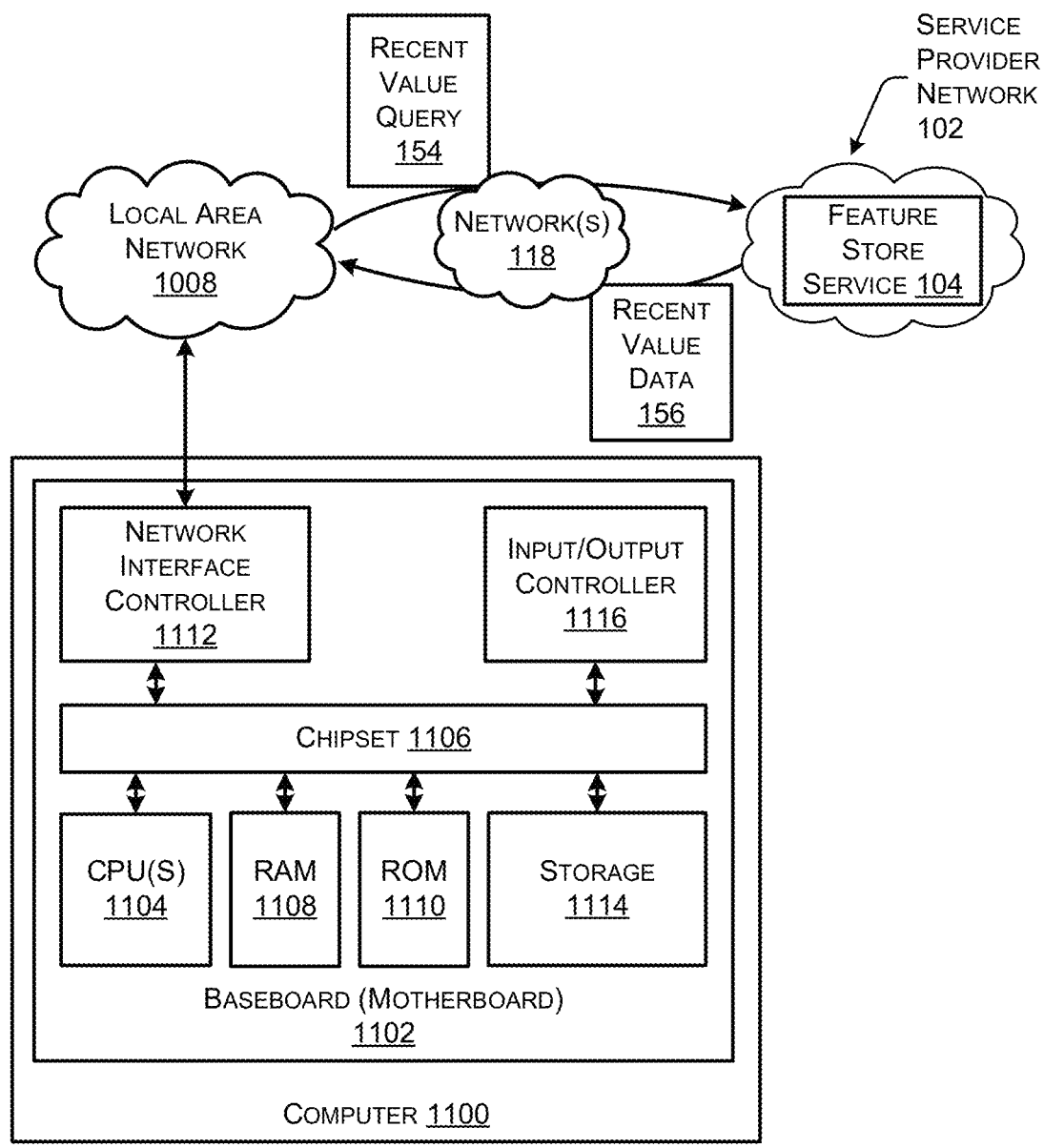
FIG. 11 is a computer architecture diagram showing an illustrative computer hardware architecture for implementing a computing device that can be utilized to implement aspects of the various technologies presented herein.

FIG. 11 shows an example computer architecture for a computer 1100 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein. In some examples, the server computer 1100 may correspond to, or be the same as or similar to, each computing device described in FIG. 1.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 118. The chipset 1106 can include functionality for providing network connectivity through a network interface controller (NIC) 1112, such as a gigabit Ethernet adapter. The NIC 1112 is capable of connecting the computer 1100 to other computing devices over the network 118. It should be appreciated that multiple NICs 1112 can be present in the computer 1100, connecting the computer to other types of networks and remote computer systems.

The computer 1100 can include storage 1114 (e.g., disk) that provides non-volatile storage for the computer. The storage 1114 can consist of one or more physical storage units. The storage 1114 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the storage 1114 by detecting the physical states or characteristics of one or more particular locations within the physical storage units.

In addition to the storage 1114 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100. In some examples, the operations performed by the service provider network 102, and or any components included therein, may be supported by one or more devices similar to computer 1100. Stated otherwise, some or all of the operations performed by the service provider network 102, and or any components included therein, may be performed by one or more computer devices 1100 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1114 can store an operating system utilized to control the operation of the computer 1100. According to one embodiment, the operating system comprises the LINUX operating system. According to another embodiment, the operating system comprises the WINDOWS SERVER operating system from MICROSOFT Corporation of Redmond, Wash. According to further embodiments, the operating system can comprise the UNIX operating system or one of its variants. It should be appreciated that other operating systems can also be utilized. The storage 1114 can store other system or application programs and data utilized by the computer 1100.

In one embodiment, the storage 1114, RAM 1108, ROM 1110, and/or other computer-readable storage media may be encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various techniques described above. The computer 1100 can also include computer-readable storage media having instructions stored thereupon for performing any of the other computer-implemented operations described herein.

Generally, the computer 1100 may be an example of a computing device 112 (and other computing devices, servers, etc.) described herein. The CPU(s) 1104, RAM 1108, ROM 1110, storage 1114, bandwidth of the NIC 1112, and/or other resources of the computer 1100 may be allocated to one or more different VM instances 114 as described herein based on the VM instance types.

The computer 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or might utilize an architecture completely different than that shown in FIG. 11.

As illustrated, the service provider network 102 may send migration data to the computer 1100 that causes the computer 1100 to send a recent value query 154 over the network(s) 118, 1008 to the service provider network 102 where the feature store service 104 may access the most recent values 148 for a corresponding feature grouping 144 used to train a specified ML model 116, and return recent value data 156 corresponding to the recent value query 154 to the computer 1100. This recent value data 156 may be utilized to generate a real-time inference 158 using any of the techniques disclosed herein.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
receiving, from a customer account registered with a service provider, a request to create a feature group comprising one or more features, the one or more features including at least an identifier feature for identifying the feature group;
creating a first database associated with the customer account, the first database configured to store data representing a most recent record including values associated with the one or more features in the feature group;
creating a second database associated with the customer account, the second database configured to store data representing one or more records including values associated with the one or more features in the feature group;
receiving, from the customer account at a first time, first data including the identifier feature and first values associated with the one or more features;
storing, in the first database, the first values associated with the one or more features as the most recent record at the first time;
storing, in the second database, the first values associated with the one or more features as a first record at the first time;
receiving, from the customer account at a second time, second data including the identifier feature and second values associated with the one or more features;
determining that the second time is more recent than the first time;
storing, in the first database and based at least in part on determining that the second time is more recent than the first time, the second values associated with the one or more features as the most recent record at the second time, wherein storing the second values comprises overwriting the first values in the first database; and
storing, in the second database, the second values as a second record at the second time, wherein storing the second record comprises appending the second record to the second database.

2. The computer-implemented method of claim 1, further comprising:
receiving, from the customer account, a first query including a target identifier feature indicating a target feature group;
identifying the target feature group based at least in part on the target identifier feature;
generating a graphical user interface (GUI) that includes the target feature group; and
causing the GUI to be displayed on a computing device associated with the customer account.

3. The computer-implemented method of claim 2, wherein the GUI comprises a first GUI, and further comprising:
receiving, from the customer account, a second query including a target feature;
identifying the target feature based at least in part on the second query and the target feature group;
generating a second GUI that includes the target feature; and
causing the second GUI to be displayed on the computing device associated with the customer account.

4. The computer-implemented method of claim 1, wherein a first feature of the one or more features is associated with a tag, and the computer-implemented method further comprising:

receiving, from the customer account, a query including the tag;
identifying, in the second data store and based at least in part on the tag, the first feature;
generating a graphical user interface (GUI) including the first feature; and
causing the GUI to be displayed on a computing device associated with the customer account.

5. The computer-implemented method of claim 1, wherein the request to create the feature group includes metadata associated with the feature group, and the computer-implemented method further comprising:
creating, based at least in part on the request to create the feature group, a crawler associated with the feature group, the crawler being configured to create one or more table definitions based at least in part on the metadata; and
wherein creating at least one of the first database and the second database is based at least in part on the one or more table definitions.

6. A system comprising:
one or more processors; and
one or more computer-readable media storing computer-executable instructions that, when executed by the one or more processors, cause the one or more processors to perform operations comprising:
receiving, at a first time and from a customer account registered with a service provider, first data including an identifier feature and indicating at least a first value associated with a first feature included in a feature group associated with the identifier feature;
storing, in a first database associated with the customer account, the first value associated with the first feature as a most recent record at the first time, wherein the first database is configured to store data representing the most recent record associated with the feature group;
storing, in a second database associated with the customer account, the first value associated with the first feature as a first record at the first time, wherein the second database is configured to store data representing one or more records associated with the feature group;
receiving, from the customer account at a second time, second data including the identifier feature and indicating at least a second value associated with the first feature;
storing, in the first database and based at least in part on determining that the second time is more recent than the first time, the second value associated with the first feature as the most recent record at the second time; and
storing, in the second database, the second value as a second record at the second time.

7. The system of claim 6, the operations further comprising:
receiving, from the customer account, a first query including a target identifier feature indicating a target feature group;
identifying the target feature group based at least in part on the target identifier feature;
generating a graphical user interface (GUI) including the target feature group; and
causing the GUI to be displayed on a computing device associated with the customer account.

8. The system of claim 7, wherein the GUI comprises a first GUI, and the operations further comprising:

receiving, from the customer account, a second query including a target feature;
identifying the target feature based at least in part on the second query and the target feature group;
generating a second GUI that includes the target feature; and
causing the GUI to be displayed on the computing device associated with the customer account.

9. The system of claim 6, wherein the first feature is associated with a tag, and the operations further comprising:
receiving, from the customer account, a query including the tag;
identifying, in the second data store and based at least in part on the tag, the first feature;
generating a graphical user interface (GUI) including the first feature; and
causing the GUI to be displayed on a computing device associated with the customer account.

10. The system of claim 6, wherein the first time comprises a first event time, a first write time, and a first invocation time, and the operations further comprising:
receiving, from the customer account, a query including a target identifier feature and a request for a third value stored between a third time and a fourth time;
identifying a target feature group based at least in part on the target identifier feature;
identifying, in the second datastore, the third value associated with the first feature as a third record, wherein the third record has at least one of a fifth event time, a fifth write time, or a fifth invocation time subsequent to the third time and prior to the fourth time;
sending, to the customer account, the third value as the third record.

11. The system of claim 6, wherein the customer account is a first customer account associated with an entity, the first customer account having a first level of access, and the operations further comprising:
receiving, from a second customer account registered with the service provider and associated with the entity at a third time, third data including the identifier feature, the third data indicating a third value associated with the first feature;
determining that the second customer account has a second level of access that is less than the first level of access; and
determining to refrain from storing the third value associated with the first feature in the first datastore or the second datastore, based at least in part on determining that the second customer account has the second level of access.

12. The system of claim 6, wherein the first database is associated with a first encryption key and the second database is associated with a second encryption key, the first encryption key being different from the second encryption key.

13. The system of claim 6, wherein the feature group is a first feature group associated with a first encryption key and the identifier feature is a first identifier feature, and the operations further comprising:
receiving, from the customer account at a third time, third data including a second identifier feature and the first encryption key and indicating a third value associated with a second feature included in a second feature group associated with the second identifier feature;
determining that the first encryption key is different from a second encryption key associated with the second feature group; and
determining to refrain from storing the third value associated with the second feature in association with the second feature group, based at least in part on determining that the first encryption key is different from the second encryption key.

14. A computer-implemented method comprising:
receiving, at a first time and from a customer account registered with a service provider, first data including an identifier feature and indicating at least a first value associated with a first feature included in a feature group associated with the identifier feature;
storing, in a first database associated with the customer account, the first values associated with the first feature as a most recent record at the first time, wherein the first database is configured to store data representing the most recent record associated with the feature group;
storing, in a second database associated with the customer account, the first values associated with the first feature as a first record at the first time, wherein the second database is configured to store data representing one or more records associated with the feature group;
receiving, from the customer account at a second time, second data including the identifier feature and indicating at least a second value associated with the first feature;
storing, in the first database and based at least in part on determining that the second time is more recent than the first time, the second value associated with the first feature as the most recent record at the second time; and
storing, in the second database, the second value as a second record at the second time.

15. The computer-implemented method of claim 14, wherein the first feature is associated with a tag, and the method further comprising:
receiving, from the customer account, a query including the tag;
identifying, in the second data store and based at least in part on the tag, the first feature;
generating a graphical user interface (GUI) including the first feature; and
causing the GUI to be displayed on a computing device associated with the customer account.

16. The computer-implemented method of claim 14, wherein the first time comprises a first event time, a first write time, and a first invocation time, and the method further comprising:
receiving, from the customer account, a query including a target identifier feature and a request for a third value stored between a third time and a fourth time;
identifying a target feature group based at least in part on the target identifier feature;
identifying, in the second datastore, the third value associated with the first feature as a third record, wherein the third record has at least one of a fifth event time, a fifth write time, or a fifth invocation time subsequent to the third time and prior to the fourth time;
sending, to the customer account, the third value as the third record.

17. The computer-implemented method of claim 14, wherein the customer account is a first customer account associated with an entity, the first customer account having a first level of access, and the method further comprising:
receiving, from a second customer account registered with the service provider and associated with the entity at a third time, third data including the identifier feature, the third data indicating third values associated with the first feature;

determining that the second customer account has a second level of access that is less than the first level of access; and determining to refrain from storing the third values associated with the first feature in the first datastore or the second datastore, based at least in part on determining that the second customer account has the second level of access.

18. The computer-implemented method of claim 14, wherein the first database is associated with a first encryption key and the second database is associated with a second encryption key, the first encryption key being different from the second encryption key.

19. The computer-implemented method of claim 14, wherein the feature group is a first feature group associated with a first encryption key and the identifier feature is a first identifier feature, and the method further comprising:

receiving, from the customer account at a third time, third data including a second identifier feature and the first encryption key and indicating a third value associated with a second feature included in a second feature group associated with the second identifier feature;

determining that the first encryption key is different from a second encryption key associated with the second feature group; and determining to refrain from storing the third values associated with the second feature in association with the second feature group, based at least in part on determining that the first encryption key is different from the second encryption key.

20. The computer-implemented method of claim 14, further comprising:

receiving, from the customer account, a first query including a target identifier feature indicating a target feature group;

identifying the target feature group based at least in part on the target identifier feature;

generating a graphical user interface (GUI) including the target feature group; and causing the GUI to be displayed on a computing device associated with the customer account.

* * * * *